US012389061B1

(12) United States Patent
Boelte et al.

(10) Patent No.: US 12,389,061 B1
(45) Date of Patent: Aug. 12, 2025

(54) USER INTERFACES OF APPLICATIONS FOR PLAYING OR CREATING MEDIA PROGRAMS

(71) Applicant: Amazon Technologies, Inc., Seattle, WA (US)

(72) Inventors: Dylan Otto Boelte, Fairfax, CA (US); Michael Gladstone, Los Angeles, CA (US); Saba Singh, San Francisco, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/710,487

(22) Filed: Mar. 31, 2022

(51) Int. Cl.
*H04N 21/431* (2011.01)
*G06T 7/90* (2017.01)
*H04N 21/482* (2011.01)

(52) U.S. Cl.
CPC ........... *H04N 21/4312* (2013.01); *G06T 7/90* (2017.01); *H04N 21/482* (2013.01); *G06T 2207/10024* (2013.01)

(58) Field of Classification Search
CPC .... H04N 21/4312; H04N 21/482; G06T 7/90; G06T 2207/10024
See application file for complete search history.

(56) References Cited

U.S. PATENT DOCUMENTS

| | | | |
|---|---|---|---|
| 5,832,435 | A | 11/1998 | Silverman |
| 8,023,800 | B2 | 9/2011 | Concotelli |
| 8,560,683 | B2 | 10/2013 | Funk et al. |
| 8,572,243 | B2 | 10/2013 | Funk et al. |
| 8,768,782 | B1 | 7/2014 | Myslinski |
| 8,850,301 | B1 | 9/2014 | Rose |
| 9,001,178 | B1 | 4/2015 | Leske et al. |

(Continued)

FOREIGN PATENT DOCUMENTS

| | | |
|---|---|---|
| AU | 2013204532 B2 | 11/2014 |
| CA | 2977959 A1 | 9/2016 |

(Continued)

OTHER PUBLICATIONS

"Tableau" https://www.tableau.com/blog/introducing-profile-page-sleek-tableau-public-viz Jul. 21, 2021 . (Year: 2021).*
"Tableau" https://www.tableau.com/blog/introducing-profile-page-sleek-tableau-public-viz Jul. 21, 2021.*
Arora, S. et al., "A Practical Algorithm for Topic Modeling with Provable Guarantees," Proceedings in the 30th International Conference on Machine Learning, JMLR: W&CP vol. 28, published 2013 (Year: 2013), 9 pages.

(Continued)

*Primary Examiner* — Sherrod L Keaton
(74) *Attorney, Agent, or Firm* — Athorus, PLLC

(57) ABSTRACT

A page is generated for a media program based on an image associated with the media program, such as an image of a creator of the media program. A predominant color within the image is identified, and a first color that is proximate or similar to the predominant color is selected from a color palette. A second color is selected as a counterpart to the first color. Code for a page including a section in the first color and a section in the second color, as well as the image, is generated and transmitted to a device for display by a user interface of an application for playing media. The page also includes interactive features enabling a listener to participate in the media program, and visual features identifying a participant speaking during the media program or one or more attributes of the speech of the participant.

20 Claims, 25 Drawing Sheets
(20 of 25 Drawing Sheet(s) Filed in Color)

(56) References Cited

U.S. PATENT DOCUMENTS

| | | |
|---|---|---|
| 9,003,032 B2 | 4/2015 | Funk et al. |
| 9,369,740 B1 | 6/2016 | Funk et al. |
| 9,613,636 B2 | 4/2017 | Gibbon et al. |
| 9,706,253 B1 | 7/2017 | Funk et al. |
| 9,729,596 B2 | 8/2017 | Sanghavi et al. |
| 9,781,491 B2 | 10/2017 | Wilson |
| 9,872,069 B1 | 1/2018 | Funk et al. |
| 10,015,589 B1 | 7/2018 | Ebenezer |
| 10,083,169 B1 | 9/2018 | Ghosh et al. |
| 10,091,547 B2 | 10/2018 | Sheppard et al. |
| 10,110,952 B1 | 10/2018 | Gupta et al. |
| 10,135,887 B1 | 11/2018 | Esser et al. |
| 10,140,364 B1 | 11/2018 | Diamondstein |
| 10,178,422 B1 | 1/2019 | Panchaksharaiah et al. |
| 10,178,442 B2 | 1/2019 | Shkedi |
| 10,264,213 B1 | 4/2019 | Sculley |
| 10,313,726 B1 | 6/2019 | Woods et al. |
| 10,356,476 B2 | 7/2019 | Dharmaji |
| 10,432,335 B2 | 10/2019 | Bretherton |
| 10,489,395 B2 | 11/2019 | Lakkur et al. |
| 10,685,050 B2 | 6/2020 | Krishna et al. |
| 10,698,906 B2 | 6/2020 | Hargreaves et al. |
| 10,700,648 B2 | 6/2020 | Lesso |
| 10,719,837 B2 | 7/2020 | Kolowich et al. |
| 10,769,678 B2 | 9/2020 | Li |
| 10,846,330 B2 | 11/2020 | Shilo |
| 10,893,329 B1 | 1/2021 | Trim et al. |
| 10,985,853 B2 | 4/2021 | Bretherton |
| 10,986,064 B2 | 4/2021 | Siegel et al. |
| 10,997,240 B1 | 5/2021 | Aschner et al. |
| 11,431,660 B1 | 8/2022 | Leeds et al. |
| 11,451,863 B1 | 9/2022 | Benjamin et al. |
| 11,463,772 B1 | 10/2022 | Wanjari et al. |
| 11,521,179 B1 | 12/2022 | Shetty |
| 11,539,845 B1 | 12/2022 | Fowers et al. |
| 11,580,982 B1 | 2/2023 | Karnawat et al. |
| 11,586,344 B1 | 2/2023 | Balagurunathan et al. |
| 11,605,387 B1 | 3/2023 | Muralitharan et al. |
| 11,900,902 B2 | 2/2024 | Martinez Ramirez et al. |
| 11,916,981 B1 | 2/2024 | Karnawat et al. |
| 2002/0042920 A1 | 4/2002 | Thomas et al. |
| 2002/0056087 A1 | 5/2002 | Berezowski et al. |
| 2003/0117486 A1 | 6/2003 | Ferren et al. |
| 2004/0057586 A1 | 3/2004 | Licht |
| 2005/0201360 A1 | 9/2005 | Redstone |
| 2005/0213726 A1 | 9/2005 | Rodman |
| 2005/0213734 A1 | 9/2005 | Rodman |
| 2005/0213735 A1 | 9/2005 | Rodman et al. |
| 2006/0018457 A1 | 1/2006 | Unno et al. |
| 2006/0018458 A1 | 1/2006 | McCree et al. |
| 2006/0268667 A1 | 11/2006 | Jellison et al. |
| 2007/0124756 A1 | 5/2007 | Covell et al. |
| 2007/0271518 A1 | 11/2007 | Tischer et al. |
| 2007/0271580 A1 | 11/2007 | Tischer et al. |
| 2008/0086742 A1 | 4/2008 | Aldrey et al. |
| 2008/0201424 A1 | 8/2008 | Darcie |
| 2009/0044217 A1 | 2/2009 | Lutterbach et al. |
| 2009/0076917 A1 | 3/2009 | Jablokov et al. |
| 2009/0100098 A1 | 4/2009 | Feher et al. |
| 2009/0254934 A1 | 10/2009 | Grammens |
| 2009/0298417 A1 | 12/2009 | Phillips |
| 2010/0088187 A1 | 4/2010 | Courtney et al. |
| 2010/0280641 A1 | 11/2010 | Harkness et al. |
| 2011/0063406 A1 | 3/2011 | Albert et al. |
| 2011/0067044 A1 | 3/2011 | Albo |
| 2011/0267419 A1 | 11/2011 | Quinn et al. |
| 2012/0040604 A1 | 2/2012 | Amidon et al. |
| 2012/0191774 A1 | 7/2012 | Bhaskaran et al. |
| 2012/0304206 A1 | 11/2012 | Roberts et al. |
| 2012/0311444 A1* | 12/2012 | Chaudhri ............ G11B 27/34 715/716 |
| 2012/0311618 A1 | 12/2012 | Blaxland |
| 2012/0331168 A1 | 12/2012 | Chen |
| 2013/0074109 A1 | 3/2013 | Skelton et al. |
| 2013/0247081 A1 | 9/2013 | Vinson et al. |
| 2013/0253934 A1 | 9/2013 | Parekh et al. |
| 2014/0019225 A1 | 1/2014 | Guminy et al. |
| 2014/0040494 A1 | 2/2014 | Deinhard et al. |
| 2014/0068432 A1* | 3/2014 | Kucharz ............ G06Q 10/107 715/716 |
| 2014/0073236 A1 | 3/2014 | Iyer |
| 2014/0108531 A1 | 4/2014 | Klau |
| 2014/0123191 A1 | 5/2014 | Hahn et al. |
| 2014/0228010 A1 | 8/2014 | Barbulescu et al. |
| 2014/0325557 A1 | 10/2014 | Evans et al. |
| 2014/0372179 A1 | 12/2014 | Ju et al. |
| 2015/0095014 A1 | 4/2015 | Marimuthu |
| 2015/0163184 A1 | 6/2015 | Kanter et al. |
| 2015/0242068 A1 | 8/2015 | Losey et al. |
| 2015/0248798 A1 | 9/2015 | Howe et al. |
| 2015/0254056 A1 | 9/2015 | Walker et al. |
| 2015/0289021 A1 | 10/2015 | Miles |
| 2015/0319472 A1 | 11/2015 | Kotecha et al. |
| 2015/0326922 A1 | 11/2015 | Givon et al. |
| 2016/0027196 A1* | 1/2016 | Schiffer ............ G06F 40/106 715/202 |
| 2016/0093289 A1 | 3/2016 | Pollet |
| 2016/0188728 A1 | 6/2016 | Gill et al. |
| 2016/0217488 A1 | 7/2016 | Ward et al. |
| 2016/0224311 A1 | 8/2016 | Touch et al. |
| 2016/0266781 A1 | 9/2016 | Dandu et al. |
| 2016/0291926 A1 | 10/2016 | Hundemer |
| 2016/0293036 A1 | 10/2016 | Niemi et al. |
| 2016/0330529 A1 | 11/2016 | Byers |
| 2017/0127136 A1 | 5/2017 | Roberts et al. |
| 2017/0164357 A1 | 6/2017 | Fan et al. |
| 2017/0193531 A1 | 7/2017 | Fatourechi et al. |
| 2017/0213248 A1 | 7/2017 | Jing et al. |
| 2017/0289617 A1 | 10/2017 | Song et al. |
| 2017/0329466 A1 | 11/2017 | Krenkler et al. |
| 2017/0366854 A1 | 12/2017 | Puntambekar et al. |
| 2018/0025078 A1 | 1/2018 | Quennesson |
| 2018/0035142 A1 | 2/2018 | Rao et al. |
| 2018/0061393 A1 | 3/2018 | Osotio |
| 2018/0184213 A1 | 6/2018 | Lesimple et al. |
| 2018/0205797 A1 | 7/2018 | Faulkner |
| 2018/0227632 A1 | 8/2018 | Rubin et al. |
| 2018/0255114 A1* | 9/2018 | Dharmaji ............ G06F 16/435 |
| 2018/0293221 A1 | 10/2018 | Finkelstein et al. |
| 2018/0322411 A1 | 11/2018 | Wang et al. |
| 2018/0367229 A1 | 12/2018 | Gibson et al. |
| 2019/0052934 A1 | 2/2019 | Groves et al. |
| 2019/0065610 A1 | 2/2019 | Singh |
| 2019/0132636 A1 | 5/2019 | Gupta et al. |
| 2019/0156196 A1 | 5/2019 | Zoldi et al. |
| 2019/0171762 A1 | 6/2019 | Luke et al. |
| 2019/0273570 A1 | 9/2019 | Bretherton |
| 2019/0327103 A1 | 10/2019 | Niekrasz |
| 2019/0364359 A1 | 11/2019 | Ferguson et al. |
| 2019/0385600 A1 | 12/2019 | Kim |
| 2020/0021888 A1 | 1/2020 | Brandao et al. |
| 2020/0106885 A1 | 4/2020 | Koster et al. |
| 2020/0160458 A1 | 5/2020 | Bodin et al. |
| 2020/0226418 A1 | 7/2020 | Dorai-Raj et al. |
| 2020/0279553 A1 | 9/2020 | McDuff et al. |
| 2020/0364727 A1 | 11/2020 | Scott-Green et al. |
| 2021/0090224 A1* | 3/2021 | Zhou ............ G09G 5/377 |
| 2021/0104245 A1 | 4/2021 | Alas et al. |
| 2021/0105149 A1 | 4/2021 | Roedel et al. |
| 2021/0125054 A1 | 4/2021 | Banik et al. |
| 2021/0160588 A1 | 5/2021 | Joseph et al. |
| 2021/0210102 A1 | 7/2021 | Huh et al. |
| 2021/0217413 A1 | 7/2021 | Tushinskiy et al. |
| 2021/0224319 A1 | 7/2021 | Ingel et al. |
| 2021/0232577 A1 | 7/2021 | Ogawa et al. |
| 2021/0256086 A1 | 8/2021 | Askarian et al. |
| 2021/0281925 A1 | 9/2021 | Shaikh et al. |
| 2021/0366462 A1 | 11/2021 | Yang et al. |
| 2021/0374391 A1 | 12/2021 | Jorasch et al. |
| 2021/0407520 A1* | 12/2021 | Neckermann ............ G10L 17/16 |
| 2022/0038783 A1 | 2/2022 | Wee |
| 2022/0038790 A1 | 2/2022 | Duan et al. |
| 2022/0159377 A1 | 5/2022 | Wilberding et al. |
| 2022/0223286 A1 | 7/2022 | Lach et al. |

(56) References Cited

U.S. PATENT DOCUMENTS

| | | |
|---|---|---|
| 2022/0230632 A1 | 7/2022 | Maitra et al. |
| 2022/0254348 A1 | 8/2022 | Tay et al. |
| 2022/0286748 A1 | 9/2022 | Dyer et al. |
| 2022/0369034 A1 | 11/2022 | Kumar et al. |
| 2022/0415327 A1 | 12/2022 | Fowers et al. |
| 2022/0417297 A1 | 12/2022 | Daga et al. |
| 2023/0036192 A1 | 2/2023 | Alakoye |
| 2023/0085683 A1 | 3/2023 | Turner |
| 2023/0217195 A1 | 7/2023 | Poltorak |
| 2024/0031489 A1 | 1/2024 | Lundin et al. |
| 2024/0289086 A1 | 8/2024 | Korb et al. |

FOREIGN PATENT DOCUMENTS

| | | |
|---|---|---|
| CN | 104813305 A | 7/2015 |
| DE | 112020002288 | 2/2022 |
| KR | 20170079496 A | 7/2017 |
| WO | 2019089028 A1 | 5/2019 |

OTHER PUBLICATIONS

Github, "Spotify iOS SDK," GitHub.com, GitHub Inc. and GitHub B.V., Feb. 17, 2021, available at URL: https://github.com/spotify/ios-sdk#how-do-app-remote-calls-work, 10 pages.

Stack Overflow, "Audio mixing of Spotify tracks in IOS app," stackoverflow.com, Stack Overflow Network, Jul. 2012, available at URL: https://stackoverflow.com/questions/11396348/audio-mixing-of-spotify-tracks-in-ios-app, 2 pages.

Hoegen, Rens, et al. "An End-to-End Conversational Style Matching Agent." Proceedings of the 19th ACM International Conference on Intelligent Virtual Agents. 2019, pp. 1-8. (Year: 2019).

Tengeh, R. K., & Udoakpan, N. (2021). Over-the-Top Television Services and Changes in Consumer Viewing Patterns in South Africa. Management Dynamics in the Knowledge Economy. 9(2), 257-277. DOI 10.2478/mdke-2021-0018 ISSN: 2392-8042 (online) www.managementdynamics.ro; URL: https://content.sciendo.com/view/journals/mdke/mdke-overview.xml.

* cited by examiner

USER INTERFACES OF APPLICATIONS FOR PLAYING OR CREATING MEDIA PROGRAMS

BACKGROUND

Today, many media programs are broadcast "live" to viewers or listeners over the air, e.g., on radio or television, or streamed or otherwise transmitted to the viewers or listeners over one or more computer networks which may include the Internet in whole or in part. Episodes of such media programs may include music, comedy, "talk" radio, interviews or any other content. Alternatively, media programs may be presented to viewers or listeners in a prerecorded format or "on demand," thereby permitting such other viewers or listeners to receive a condensed viewing or listening experience of the media program, after the media program was already aired and recorded at least once.

Media programs may be played by viewers or listeners using an ever-growing number of systems such as automobiles, desktop computers, laptop computers, media players, smartphones, smart speakers, tablet computers, televisions, wristwatches, or other like machines. For example, a viewer or a listener may commonly initiate a playing of a media program by one or more interactions with a user interface rendered on a display. The viewer or listener may use a finger, a mouse or another implement to interact with one or more interactive features rendered in a user interface, e.g., to select a media program, to initiate a playing of the media program, or to take any other actions in association with the media program.

A user interface of an application for playing media programs typically includes information regarding such media programs, e.g., a title of a media program, a name of a creator or a host of the media program, an image associated with the media program, or other identifying information relating to the media program, as well as one or more controls for initiating or terminating a playing of the media program, e.g., "play" or "pause" buttons. A listener who is interested in listening to a media program may browse through pages generated for media programs, and read or interpret information or data displayed within such pages when determining whether to listen to a media program, or when selecting one of the media programs for listening.

User interfaces of applications for playing media programs are typically static in nature, within limited to no variability in information displayed for different media programs. Moreover, where a media program includes multiple participants, e.g., a creator or host, and one or more guests, a user interface is typically incapable of indicating which of the participants is speaking at any given moment. Additionally, where a media program is broadcast "live" to devices of listeners, such user interfaces do not commonly enable a listener to "call in," or join, a media program that is then in progress.

Furthermore, applications for playing media programs typically do not permit a viewer or a listener to become a creator of media. Instead, the viewer or listener must instead utilize separate and typically unrelated applications to view or listen to media content, and to create or host media content.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

As is set forth in greater detail below, the present disclosure is directed to user interfaces of applications for playing or creating media programs. More specifically, in some implementations, systems and methods of the present disclosure are directed to generating visual themes for user interfaces with colors or other features that are selected for media programs, based on information or data regarding the media programs or creators thereof.

Colors or other features of a visual theme may be selected based on attributes of an image associated with a media program, including a first color selected based on a predominant color of the image, and a second color selected as a counterpart to the first color. An application for playing media programs may be programmed or configured to display user interfaces having images, icons or other features regarding a creator or a host of the media program in a manner consistent with a visual theme, as well as images, icons or other features regarding any other participants in the media program, e.g., guests on the media program. The applications may further be configured to display user interfaces having one or more dynamic features for indicating which of a plurality of participants in a media program is audibly contributing to a media program at a given time, or for indicating one or more attributes of his or her audible contributions, e.g., colors or other attributes representing frequencies, intensities or other attributes, in a manner consistent with the visual theme. The user interfaces may also include one or more interactive features (e.g., buttons) that, when selected, enable a listener to join a media program in progress, or permit a listener to become a creator or a host of another media program.

Figure 1A:
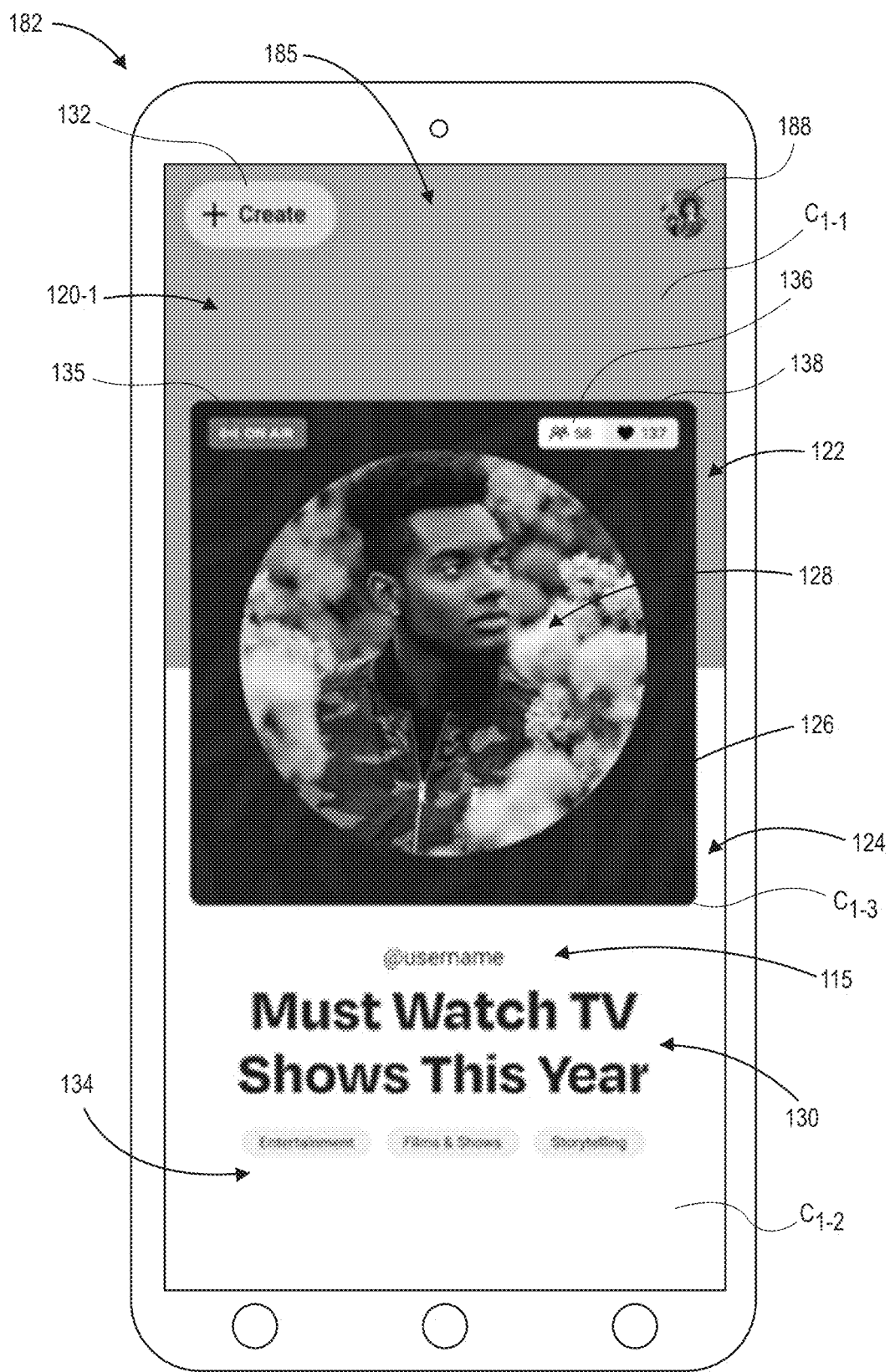
FIGS. 1A through 1E are views of aspects of one system for playing media in accordance with embodiments of the present disclosure.

Referring to FIGS. 1A through 1E, views of aspects of one system for playing media in accordance with embodiments of the present disclosure are shown. As is shown in FIG. 1A, a mobile device 182 includes a user interface 120-1 rendered on a display 185. The user interface 120-1 is associated with a media program, and may be a page, a card (e.g., a page having finite dimensions), a window, or any other visual element that may be configured for displaying information or data to users of applications for playing or creating media programs.

The user interface 120-1, and other user interfaces associated with the media program, may be displayed with colors or other features that are selected in accordance with a visual theme established for the media program. The user interface 120-1 includes a first section 122 in a first color $C_{1-1}$, a second section 124 in a second color $C_{1-2}$, and a third section 126 in a third color $C_{1-3}$, with an image 128 displayed thereon. The user interface 120-1 also includes a title 130 or another label identifying the media program, and an identifier 115 of a creator (or a host) of the media program. The user interface 120-1 also includes an interactive feature 132 that, upon a selection by a listener, may enable the listener to become a creator of a media program, and may cause one or more user interfaces (e.g., pages, cards, windows or others) for designating or establishing one or more parameters of a media program, or initiating transmission of media content in accordance with the media program, to be displayed on the display 185.

The user interface 120-1 further includes a plurality of tags 134 or other phrases identifying subjects or topics of the media program, as well as an indicator 135 that the media program is being aired "live," or in real time or near-real time as media content of the media program is generated, subject to any intentional or regulatory delays that may be required or relevant to the media program. The user interface 120-1 also includes an identifier 136 of a number of listeners to the media program and an identifier 138 of a number of such listeners who have provided a positive rating or interaction regarding the media program. The user interface 120-1 further includes an icon 188 that may be selected to access or identify information regarding a listener associated with the mobile device 182, e.g., a profile or another set of information or data identifying one or more settings or preferences associated with the listener or the mobile device 182. In some implementations, the display 185 (or other displays of the present disclosure) may be a capacitive touchscreen, a resistive touchscreen, or any other system for receiving interactions by a listener. In accordance with implementations of the present disclosure, the user interface 120-1, or other user interfaces, may include any number of buttons, text boxes, checkboxes, drop-down menus, list boxes, toggles, pickers, search fields, tags, sliders, icons, carousels, or any other interactive or selectable elements or features that are configured to display information to listeners or other users, or to receive interactions from the listeners or other users.

Alternatively, or additionally, a listener may interact with the user interface 120-1 or the mobile device 182 in any other manner, such as by way of any input/output ("I/O") devices, e.g., a mouse, a stylus, a touchscreen, a keyboard, a trackball, or a trackpad, as well as any voice-controlled devices or software (e.g., a personal assistant), which may capture and interpret voice commands using one or more microphones or acoustic sensors provided on the mobile device 182 or any other systems (not shown).

As is shown in FIG. 1A, the first section 122 in the first color $C_{1-1}$ and the second section 124 in the second color $C_{1-2}$ each occupy a full width of the display 185, and approximately equal portions of a height of the display 185. The first section 122 in the first color $C_{1-1}$ and the second section 124 in the second color $C_{1-2}$ are aligned substantially vertically within the display 185, and separated by a substantially horizontal line. The third section 126 in the third color $C_{1-3}$ including the image 128 has a substantially square shape and is provided on the line between the first section 122 in the first color $C_{1-1}$ and the second section 124 in the second color $C_{1-2}$. The third section 126 has a width that is slightly less than a width of the display 185, such that portions of the first section 122 in the first color $C_{1-1}$ and the second section 124 in the second color $C_{1-2}$, and the line therebetween, are visible on either side of the third section 126 in the third color $C_{1-3}$.

In some implementations of the present disclosure, the first color $C_{1-1}$, the second color $C_{1-2}$ or the third color $C_{1-3}$ may be selected based at least in part on the image 128, which may depict a creator of the media program, any other individual or entity associated with the media program, e.g., a guest or a participant in the media program. Alternatively, the image 128 may depict a symbol, a logo, an icon, a flag, or any other item or feature of the media program. The first color $C_{1-1}$, the second color $C_{1-2}$ or the third color $C_{1-3}$ may be selected based on the image 128 in any other manner. For example, in some implementations, a histogram of the image 128 may be performed, and one or more colors of the image 128 may be identified based on the histogram, such as a predominant color of the image 128. Alternatively, one or more colors may be selected from the image 128 in any other manner.

Once one or more colors are identified or selected from the image 128, such colors may be used as a basis for selecting one or more colors of the user interface 120-1, e.g., the first color $C_{1-1}$, the second color $C_{1-2}$ or the third color $C_{1-3}$. For example, as is shown in FIG. 1A, at least a plurality, if not a majority, of pixels of the image 128 is in one or more shades of pink. Therefore, the first color $C_{1-1}$ may be a shade of pink selected from a color palette, e.g., a finite set of colors that may be available for depiction in a page rendered within a user interface, and may be determined or quantified according to one or more standards. Alternatively, a color may be selected from the image 128 on any other basis, and used to identify or select one or more colors of sections of the user interface 120-1. For example, where large or substantial portions of the image 128 depict bland, neutral or ordinary colors, and small or insignificant portions of the image 128 depict bright, vivid or striking colors, one or more of the bright, vivid or striking colors of the image 128 may be identified and used as a basis to select one or more images from a color palette.

As is further shown in FIG. 1A, the second color $C_{1-2}$ is a shade of white or is otherwise substantially plain, while the third color $C_{1-3}$ is a shade of purple or another substantially dark color. In some implementations, one or more of the second color $C_{1-2}$ or the third color $C_{1-3}$ may be selected, e.g., either from the same color palette or independently, as a counterpart to the first color $C_{1-1}$, to enhance a level of contrast between the first color $C_{1-1}$ and the image 128.

The user interface 120-1 shown in FIG. 1A may be displayed by applications for playing media programs that are executed by one or more devices or systems of listeners, either independently or along with any other user interfaces (e.g., pages, cards, windows or others) associated with any number of other media programs, such as in a scrolling series or other dynamic pattern. A listener or other operator of the mobile device 182 may request that the media program associated with the user interface 120-1 be transmitted to the mobile device 182 by one or more gestures or other interactions with the display 185, e.g., a selection of the image 128 or any other portion of the user interface 120-1.

Figure 1B:
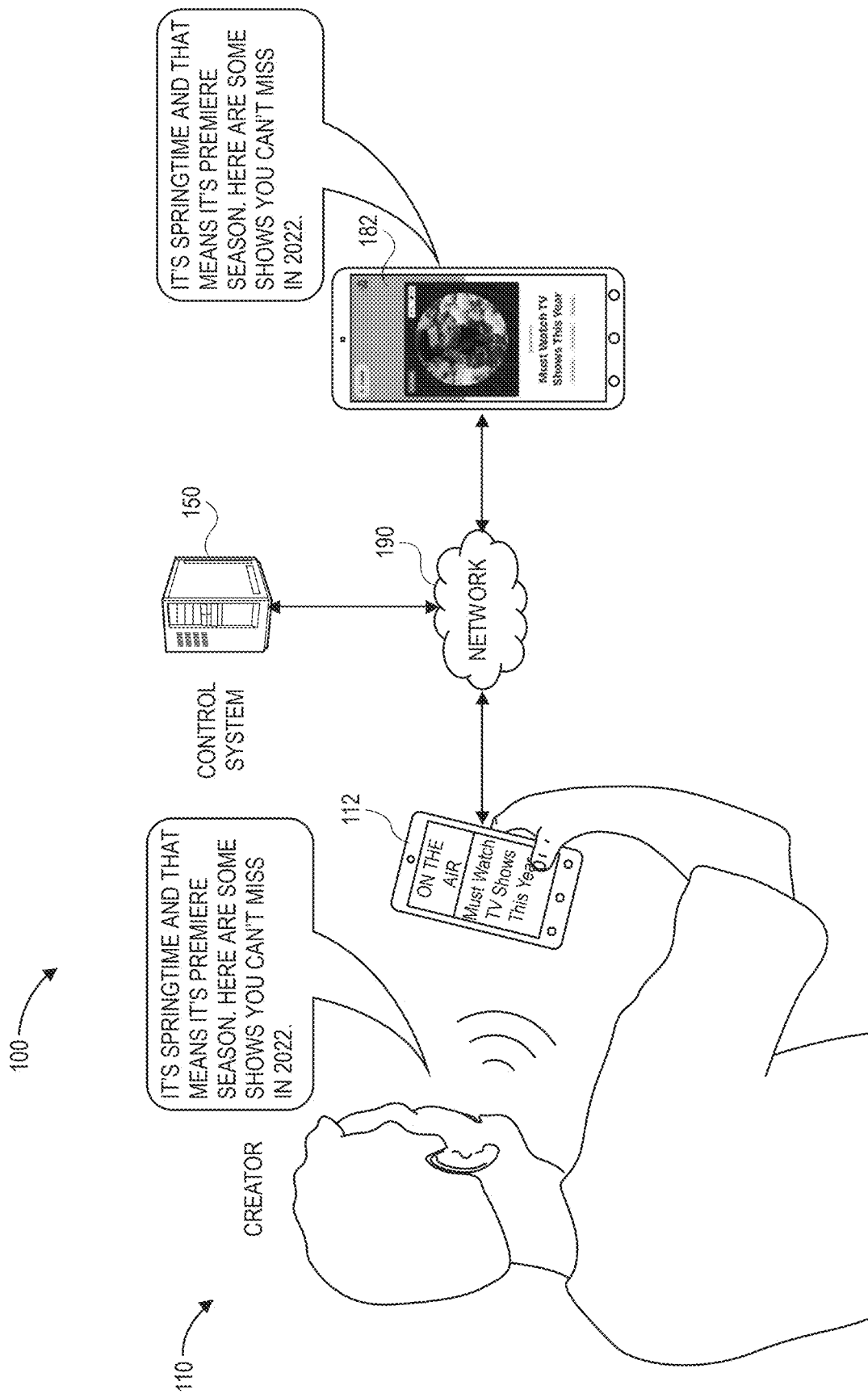

As is shown in FIG. 1B, a system 100 includes a mobile device 112 (e.g., a smartphone, a tablet computer, a laptop computer, or any other system or device) of a creator 110 (e.g., a user, or a host), a control system 150 (e.g., one or more servers or other computer systems) and the mobile device 182 that are connected to one another over one or more networks 190, which may include the Internet in whole or in part. Alternatively, the system 100 may further include any number of music sources (e.g., servers or other computer systems having access to catalogs, repositories, streaming sources, or other sources of songs, podcasts or other media entities) or other devices of listeners (not shown), which may be connected to the mobile device 112 of the creator 110 or the control system 150 over the one or more networks 190. Such other devices or systems may include, but need not be limited to, automobiles, desktop computers, laptop computers, media players, smart speakers, televisions, wristwatches, or others. The devices or systems that may be operated or utilized in accordance with the present disclosure are not limited by any of the devices or systems shown in FIG. 1B.

In some implementations, the control system 150 may establish a two-way or bidirectional channel or connection with the mobile device 112, and one-way or unidirectional channels or connections with the mobile device 182, or with any other devices or systems (not shown). In some other implementations, the control system 150 may establish two-way or bidirectional channels with the mobile device 112 and the mobile device 182, or with any other devices or systems (not shown).

As is shown in FIG. 1B, the mobile device 112 includes a display (e.g., a touchscreen) having information regarding a media program, e.g., the title 130, rendered thereon. Alternatively, or additionally, the mobile device 112 may include one or more interactive or selectable elements or features that enable the creator 110 to construct a media program from one or more sets of media content, or to control the transmission or receipt of media content in accordance with the media program, e.g., by the control system 150 or from any other source to the mobile device 182 or any other devices or system over the one or more networks 190.

As is further shown in FIG. 1B, the creator 110 provides an utterance of one or more words that are intended to be heard by one or more listeners, e.g., a listener operating the mobile device 182, to the mobile device 112. In particular, the creator 110 describes an episode of the media program, viz., "it's springtime, and that means it's premiere season. Here are some shows you can't miss in 2022." The mobile device 112 may capture audio data representing the utterance of the creator 110, and transmit the audio data to the control system 150 over the one or more networks 190. The control system 150 may then cause data, e.g., some or all of the audio data, to be transmitted to one or more computer systems or devices of listeners over one or more networks 190, including but not limited to the mobile device 182, which may cause the audio data to be played aloud to any individuals or entities within an operating range (or an acoustic range, e.g., earshot) of the mobile device 182.

Figure 1C:
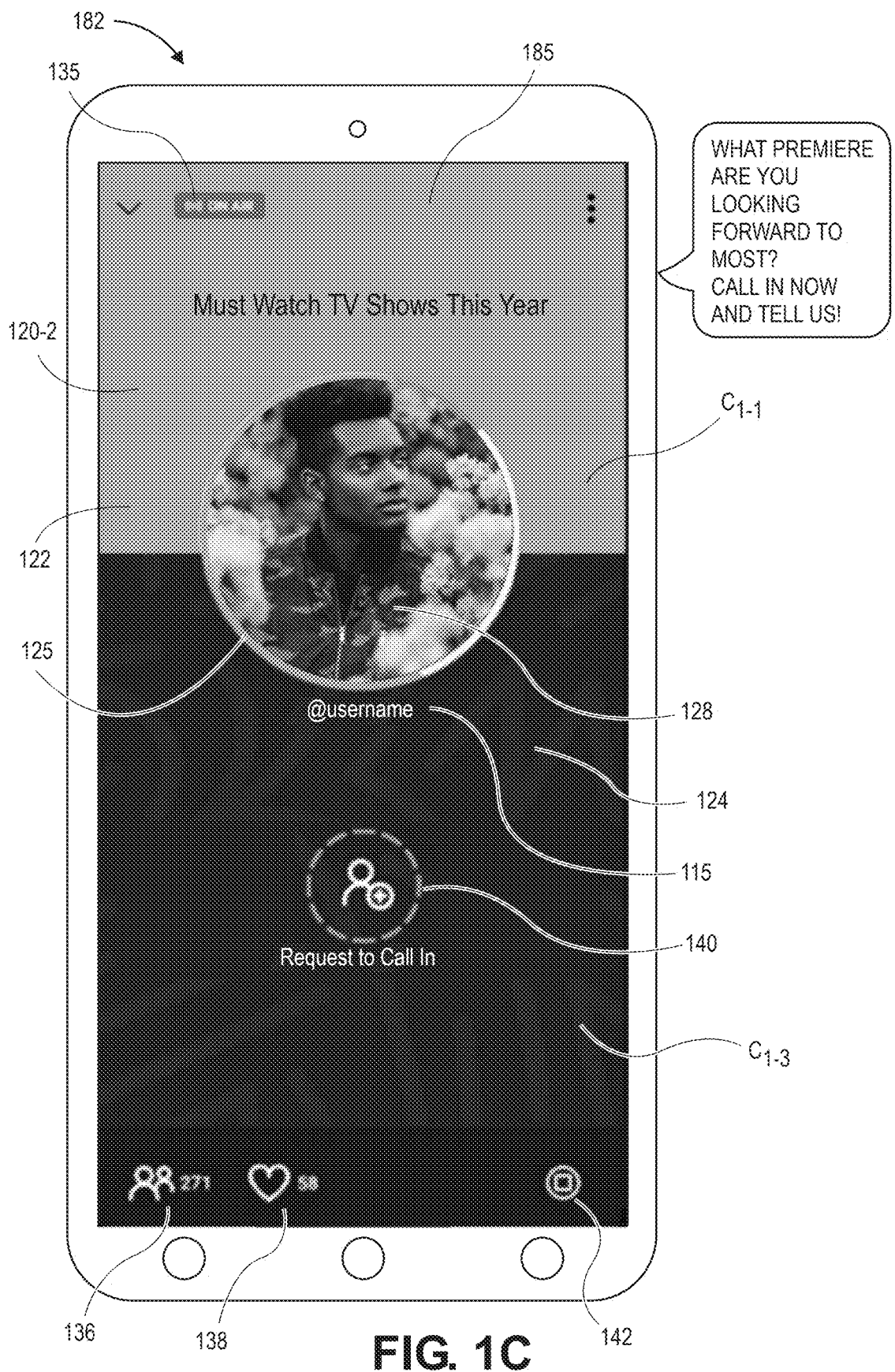

The user interfaces of applications for playing media in accordance with implementations of the present disclosure may be consistent with the visual theme and may vary in shape, form or function. As is shown in FIG. 1C, with media content of the media program being transmitted to the mobile device 182, e.g., from the mobile device 112 of the creator 110 by way of the control system 150, a user interface 120-2 (e.g., a page, a card, a window or another interface) is displayed on the mobile device 182. For example, as is shown in FIG. 1C, the user interface 120-2 includes a first section 122 in the first color $C_{1-1}$ that occupies an entire width of the display 185 and is aligned on an upper edge of the display 185, but has a smaller height than the first section 122 of the user interface 120-1. The user interface 120-2 also includes a second section 124 that is also aligned on a lower edge of the display 185. The second section 124 of the user interface 120-2 has a larger height than the second section 124 of the user interface 120-1, and is shown in the third color $C_{1-3}$, not the second color $C_{1-2}$.

Like the user interface 120-1, the user interface 120-2 displays the image 128 on a substantially horizontal line dividing the first section 122 and the second section 124. Unlike the user interface 120-1, the user interface 120-2 does not include a substantially square portion or frame around the image 128. The identifier 115 of the creator 110 is provided directly beneath the image 128, in the second section 124 in the third color $C_{1-3}$. In some implementations, a color of a font of the identifier 115 may be selected to provide a visual contrast with a background color on which the identifier 115 is displayed, e.g., the third color $C_{1-3}$, as is shown in FIG. 1C, or the second color $C_{1-2}$, as is shown in FIG. 1A.

Additionally, as is also shown in FIG. 1C, an accent icon 125 is displayed on the image 128. For example, the accent icon 125 may be a visible ring (e.g., a "speaker ring") or another marking or indication that may be displayed in association with the image 128, to visibly indicate that the creator 110 is speaking. In some implementations, the accent icon 125 may include one or more visible attributes, such as colors, sizes, dimensions, shapes, or others, that are selected based on the attributes of the voice of the creator 110. Moreover, in some implementations, visual attributes of the accent icon 125 may be varied based on changes in the voice of the creator 110. For example, where a frequency, an intensity, a sound pressure level, or a speech rate of the voice of the creator 110 changes, a visual attribute of the accent icon 125 (e.g., a color, a size, a dimension, a shape or any other attribute) may change accordingly to reflect the changes in the frequency, the intensity, the sound pressure level, or the speech rate of the creator 110. Furthermore, in some implementations, the accent icon 125 may be of any color, size, dimension or shape, and need not be limited to multi-colored circular rings. Moreover, the accent icon 125 may be displayed in any location or orientation with respect to the image 128, and need not be displayed over or around the image 128.

As is further shown in FIG. 1C, with media content of the media program being transmitted to the mobile device 182 and played thereon, the indicator 135 is provided in an upper left corner of the user interface 120-2, while the indicator 136 of a number of listeners to the media program and the indicator 138 of a number of such listeners who have provided positive ratings or interactions regarding the media program are provided in a lower left corner of the user interface 120-2. Additionally, the user interface 120-2 includes a pair of additional controls, including an interactive feature 140 that, when selected, enables a listener or another operator of the mobile device 182 to request to join or participate in the media program, e.g., in response to a request by the creator 110 or at any other time. The user interface 120-2 also includes an interactive feature 142 that, when selected, permanently or temporarily terminates a playing of the media program by the mobile device 182. In some implementations, upon a selection of the interactive feature 142, or a termination of the playing of the media program by the mobile device 182 for any other reason, the user interface 120-2 may be replaced by the user interface 120-1 of FIG. 1A, or any other user interface, which may represent the same media program as the user interfaces 120-1, 120-2 or any other media programs.

Figure 1D:
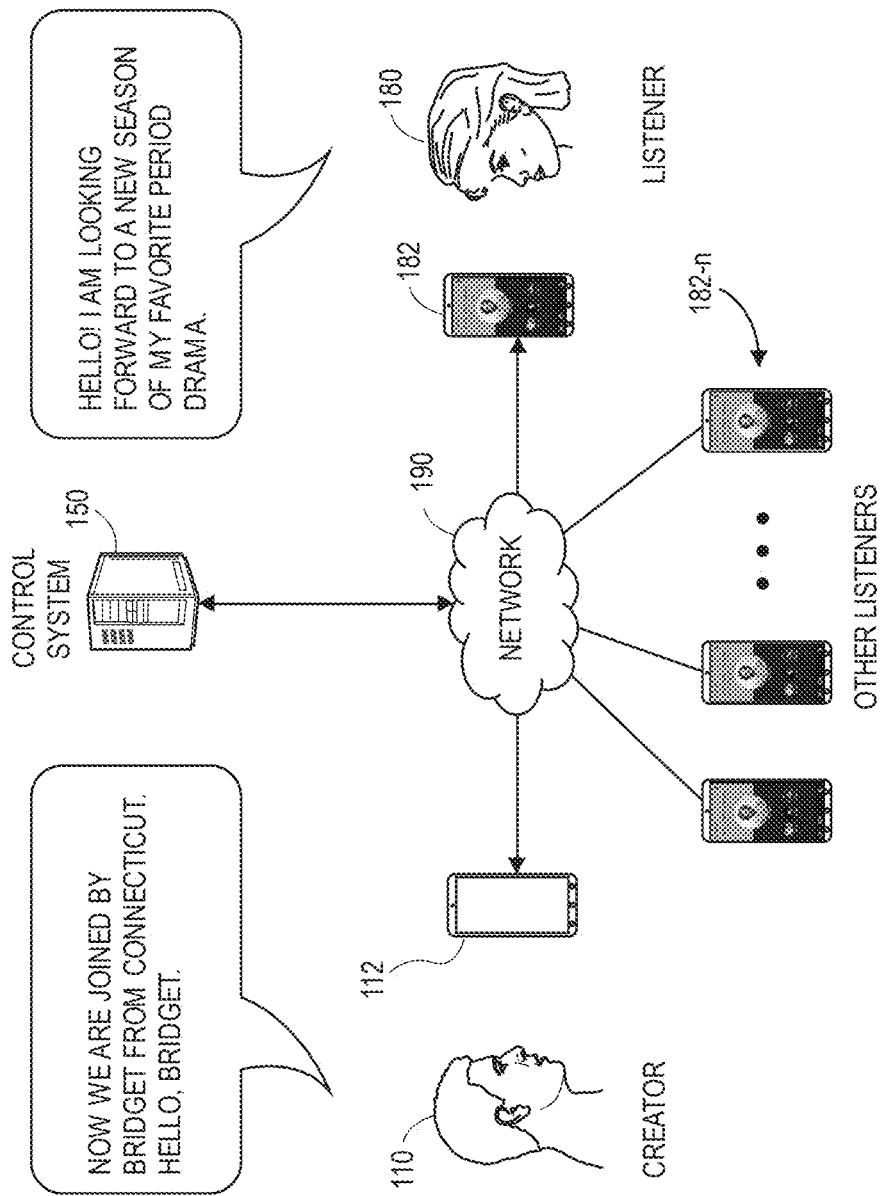

As is shown in FIG. 1D, upon a selection of the interactive feature 140, a listener 180 operating the mobile device 182 is permitted to join in the media program, and participate in the generation of media content to be transmitted to devices 180-$n$ of one or more other listeners. For example, in some implementations, the selection of the interactive feature 140 may cause a one-way communication channel, or unidirectional channel, between the mobile device 182 and the control system 150 (or any other system) to be terminated or disestablished, and a two-way communication channel, or a bidirectional channel, to be established between the mobile device 182 and the control system 150 system (or any other system) and any number of other computer devices or systems. Once the two-way or bidirectional channel is established between the mobile device 182 and the control system 150, the listener 180 may utter one or more words or other utterances, or otherwise provide any other sounds or other audio data to the mobile device 182. Audio data representing such words, utterances or sounds may be transmitted from the mobile device 182 to the control system 150, and then to the mobile device 112 of the creator 110 and each of the devices 182-$n$ of the other listeners.

Figure 1E:
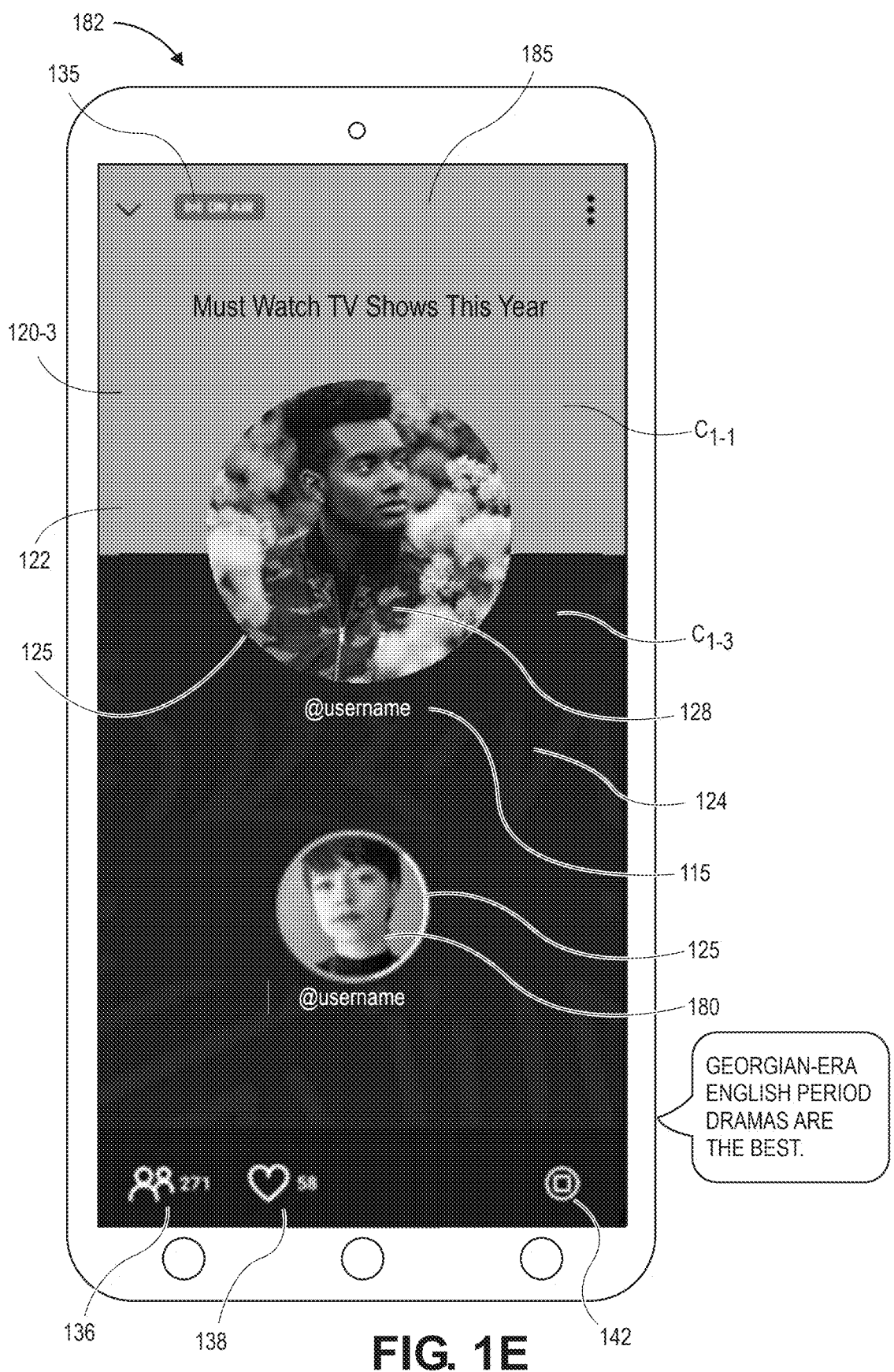

As is shown in FIG. 1E, with the listener 180 participating in the media program, and providing media content to the control system 150 in accordance with the media program, a user interface 120-3 (e.g., a page, a card, a window or another interface) is displayed on the mobile device 182. The user interface 120-3 is similar to the user interface 120-2 shown in FIG. 1C, but with an image of the listener 180 shown in the second section 124 in the third color $C_{1-3}$, in lieu of the interactive feature 140 of FIG. 1C. Additionally, as is also shown in FIG. 1E, an accent icon 125 is displayed on or around the image 180, indicating that the listener 180 is speaking. The accent icon 125 may include one or more visible attributes, such as colors, sizes, dimensions, shapes, or others, that are selected based on the attributes of the voice of the listener 180, or may vary based on changes in the voice of the listener 180.

In some implementations, where the creator 110 begins speaking, the accent icon 125 may be displayed on or around the image 128, e.g., in one or more colors, sizes, dimensions, shapes, or other attributes that are selected based on attributes of a voice of the creator 110. The accent icon 125 may move back or forth between the image 128 and the image of the listener 180, as the creator 110 or the listener 180, respectively, are speaking. Moreover, where both the creator 110 and the listener 180 are speaking, two accent icons 125 may be displayed, e.g., on both the image 128 and the image of the listener 180. Alternatively, one of the image 128 or the image of the listener 180 may be selected, e.g., based on attributes of voices of the creator 110 and the listener 180, respectively, and a single accent icon 125 may be displayed on one of the image 128 and the image of the listener 180.

Where the listener 180 departs from the media program, or where a two-way or bidirectional communication channel between the mobile device 182 and the control system 150 has been terminated or disestablished, the accent icon 125 may be displayed on or around the image 128, and the image of the listener 180 may be replaced by the interactive feature 140 of FIG. 1C, or any other visual feature. Alternatively, the user interface 120-3 may be replaced by the user interface 120-2 of FIG. 1C.

Accordingly, in some implementations, an application for playing media may display user interfaces (e.g., pages, cards, windows or other interfaces) that may include one or more colors or other features that are consistent with a visual theme selected for a media program, based on an image associated with the media program. The user interfaces may further include interactive features that enable listeners to join media programs in progress, as well as visual features that identify participants in the media programs, with visual attributes that are selected based on audio data provided by such participants, and interactive features that enable listeners to media programs to become creators (or hosts) of media programs.

A visual theme may be used to generate user interfaces (e.g., pages, cards, windows or other interfaces) in common or consistent colors for any purpose or function associated with a media program, such as informational user interfaces that are displayed with user interfaces of any other media programs, e.g., to enable a listener to select from the media programs by scrolling between such pages in a dynamic manner, as well as user interfaces for playing media programs, user interfaces for constructing media programs, or any other user interfaces. For example, a visual theme generated for a media program may designate or specify colors, images or features to be included in a user interface generally associated with a media program, e.g., a card displayed by an application with cards of other media programs that a listener may scroll through or otherwise evaluate prior to selecting one of the media programs associated with one of the cards, as well as a user interface to be displayed by an application while a selected media program is playing, a user interface displayed while a creator is establishing a media program, or any other user interface. Moreover, user interfaces that are generated in accordance with implementations of the present disclosure may include sections of any size, shape or dimension, and with colors, images or features in accordance with a visual theme.

As used herein, the term "media entity" may refer to media content of any type or form (e.g., audio and/or video) that may be recorded, stored, maintained or transmitted in one or more files, such as a movie, podcast, a song (or title), a television show, or any other audio and/or video programs. The term "media entity" may also refer to a descriptor of media content, e.g., an era, a genre, or a mood, or any other descriptor of one or more audio and/or video programs. The term "media entity" may further include a file including information, data or metadata regarding one or more sets of media content, or a physical or virtual representation of the one or more sets of media content, such as an album, a playlist, a soundtrack, or any other information, data, metadata, or representations. The term "media entity" may also include one or more persons or entities associated with such media content, e.g., an artist, a group, a label, a producer, a service, a station, or any other persons or entities.

Media content that may be included in a media program includes, but need not be limited to, one or more media entities retrieved from a music catalog, repository or streaming service, one or more advertisements of items, goods or services, or one or more news, sports or weather programs, which may be generated live or previously recorded. Media content that may be included in a media program also includes audio data representing words that are spoken or sung by a creator or one or more guests, such as musicians, celebrities, personalities, athletes, politicians, or artists, or any listeners to the media program. A control system, or any associated conference systems, broadcast systems or mixing systems, may establish or terminate connections with a creator, with any sources of media content, or with any number of listeners, to compile and efficiently transmit media content of a media program over digital channels (e.g., web-based or application-based), to any number of systems or devices of any form.

One or more of the embodiments disclosed herein may overcome limitations of existing systems and methods for presenting media programs or other content, e.g., radio programs, to listeners. Unbounded by traditional frequency bands or broadcast protocols, the systems and methods of the present disclosure may receive designations of media content from a creator of a media program, e.g., in a broadcast plan, and the media program may be transmitted over one or more networks to any number of listeners in any locations and by way of any devices. Creators of media programs may designate one or more types or files of media content to be broadcast to listeners via a user interface rendered on a display or by any type or form of computer device, in accordance with a broadcast plan or other schedule. A control system, or a mixing system, a conference system or a broadcast system, may retrieve the designated media content from any number of sources, or initiate or control the designated media content to any number of listeners, by opening one or more connections between computer devices or systems of the creator and computer devices or systems of the sources or listeners.

In some implementations of the present disclosure, one-way communication channels, or unidirectional channels, may be established between a broadcast system (or a control system) and any number of other computer devices or systems. For example, broadcast channels may be established between a broadcast system (or a control system) and sources of media or other content, or between a broadcast system (or a control system) and devices of any number of listeners, for providing media content. Two-way communication channels, or bidirectional channels, may also be established between a conference system (or a control system) and any number of other computer devices or systems. For example, a conference channel may be established between a computer device or system of a creator or another source of media and a conference system (or a control system). Furthermore, one-way or two-way communication channels may be established between a conference system and a mixing system, or between a mixing system and a broadcast system, as appropriate.

Communication channels may be established in any manner, in accordance with implementations of the present disclosure. Those of ordinary skill in the pertinent arts will recognize that computer networks, such as the Internet, may operate based on a series of protocols that are layered on top of one another. Such protocols may be collectively referred to as an Internet Protocol suite (or IP suite). One underlying layer of the IP suite is sometimes referred to in the abstract as a link layer, e.g., physical infrastructure, or wired or wireless connections between one or more networked computers or hosts. A second layer atop the link layer is a network layer, which is sometimes called an Internet Protocol layer, and is a means by which data is routed and delivered between two disparate physical locations.

A third layer in an IP suite is a transport layer, which may be analogized to a recipient's mailbox. The transport layer may divide a host's network interface into one or more channels, or ports, with each host having as many ports available for establishing simultaneous network connections. A socket is a combination of an IP address describing a host for which data is intended and a port number indicating a channel on the host to which data is directed. A socket is used by applications running on a host to listen for incoming data and send outgoing data. One standard transport layer protocol is the Transmission Control Protocol, or TCP, which is full-duplex, such that connected hosts can concurrently send and receive data. A fourth and uppermost layer in the IP suite is referred to as an application layer. Within the application layer, familiar protocols such as Hypertext Transfer Protocol (or "HTTP"), are found. HTTP is built on a request/response model in which a client sends a request to a server, which may be listening for such requests, and the server parses the request and issues an appropriate response, which may contain a network resource.

One application-layer protocol for communicating between servers and clients is called WebSocket, which provides TCP-like functionality at the application layer. Like TCP, WebSocket is full-duplex, such that once an underlying connection is established, a server may, of its own volition, push data to client devices with which the server is connected, and clients may continue to send messages to the server over the same channel. Additionally, a pure server-push technology is also built into HTML5, one version of Hypertext Markup Language. This technology, which is known as Server-Sent Events (or SSE), operates over standard HTTP, and is a novel use of an existing application-layer protocol. Server-Sent Events works by essentially sending partial responses to an initial HTTP request, such that a connection remains open, enabling further data to be sent at a later time. In view of its unidirectional nature, Server-Sent Events is useful in situations in which a server will be generating a steady stream of updates without requiring anything further from a client.

Communications channels of the present disclosure may be associated with any type of content and established computer devices and systems associated with any type of entity, and in accordance with a broadcast plan or sequence of media content, or at the control or discretion of one or more creators. One or more user interfaces rendered by or on a computer system or device may permit a creator to control the synchronization or mixing of media content by the broadcast system or the mixing system. Gestures or other interactions with the user interfaces may be translated into commands to be processed by the broadcast system or the mixing system, e.g., to play a specific media entity, to insert a specific advertisement, or to take any other relevant actions, such as to adjust a volume or another attribute or parameter of media content. Moreover, a broadcast system or the mixing system may provide any relevant information to a creator via such user interfaces, including information regarding attributes or parameters of media content that was previously played, that is being played, or that is scheduled to be played in accordance with a broadcast plan or during a media program. The broadcast system or the mixing system may further execute one or more instructions in response to rules, which may define or control media content that is to be played at select times during a media program, e.g., to automatically increase or decrease volumes or other attributes or parameters of a voice of a creator, or of other media content from other sources, on any basis. Any rules governing the playing of media content of a media program by the broadcast system or the mixing system may be overridden by a creator, e.g., by one or more gestures or other interactions with a user interface of an application in communication with the broadcast system or the mixing system that may be associated with the playing of the media content or the media program.

Figure 2A:
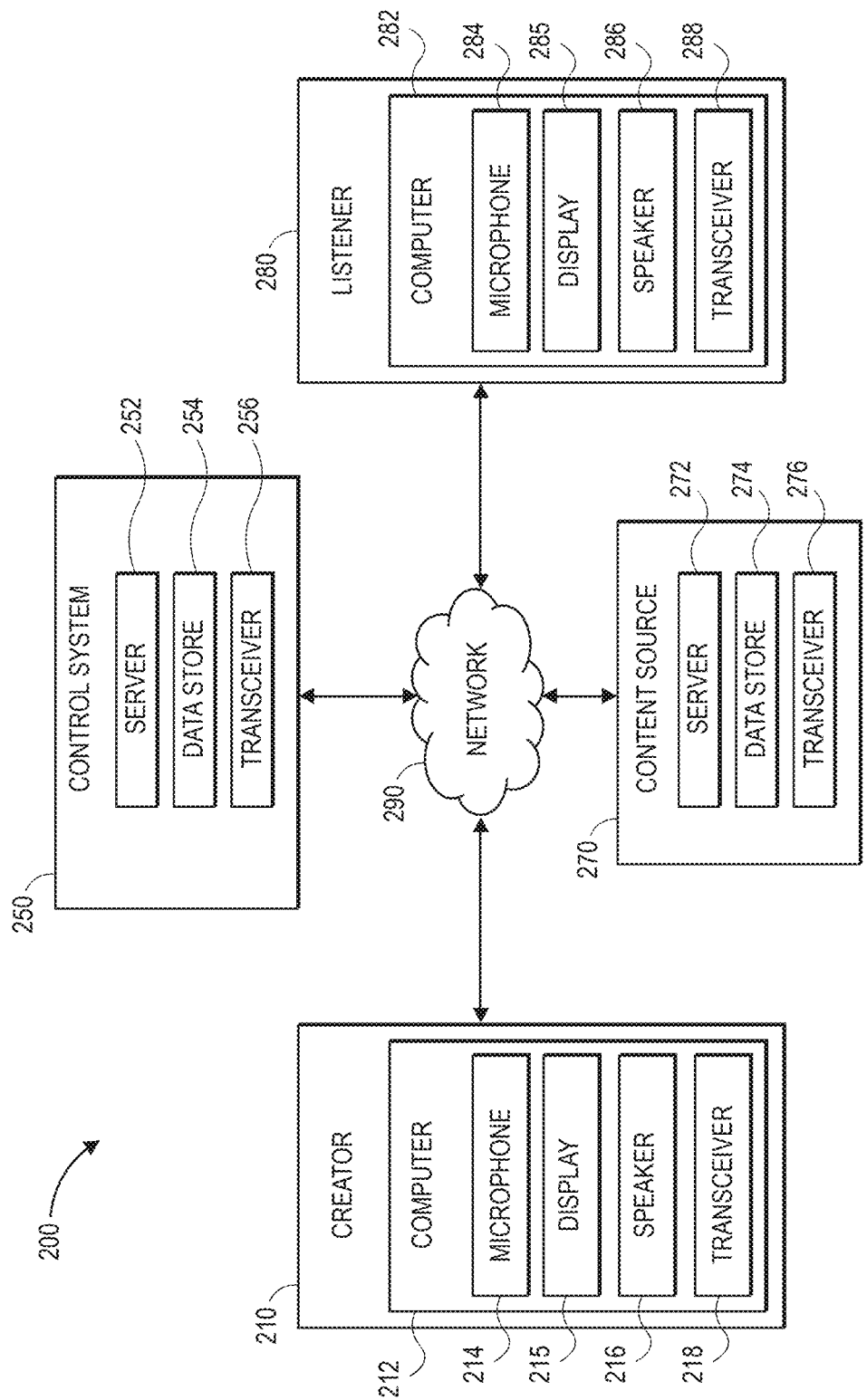
FIGS. 2A and 2B are block diagrams of components of one system for playing media in accordance with embodiments of the present disclosure.
Figure 2B:
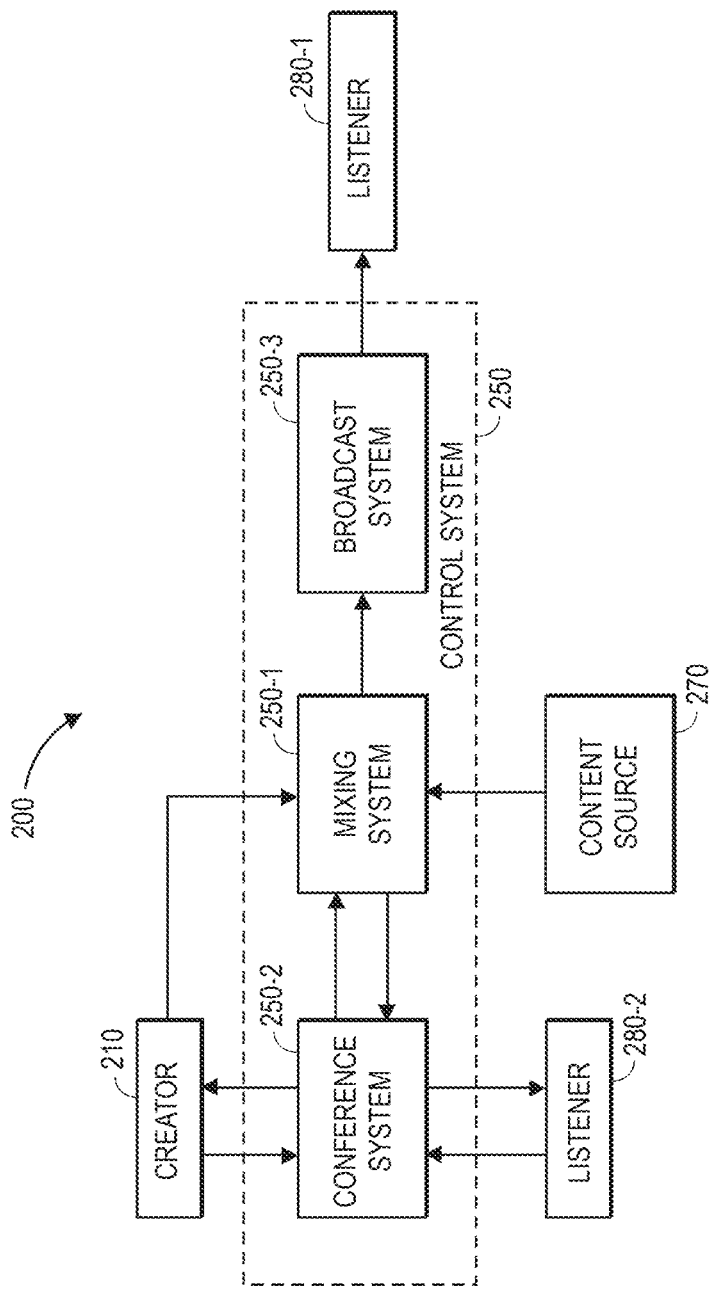

Referring to FIGS. 2A and 2B, block diagrams of components of one system 200 for playing media in accordance with embodiments of the present disclosure is shown. Except where otherwise noted, reference numerals preceded by the number "2" shown in FIG. 2A or FIG. 2B indicate components or features that are similar to components or features having reference numerals preceded by the number "1" shown in FIGS. 1A through 1E.

As is shown in FIG. 2A, the system 200 shown in FIG. 2A includes a creator 210, a control system 250, a content source 270, and a listener 280 that are connected to one another over one or more networks 290.

The creator 210 may be any individual or entity that expresses an interest or an intent in constructing a media program including media content, and providing the media program to the listener 280 over the network 290. As is shown in FIG. 2A, the creator 210 is associated with or operates a computer system 212 having a microphone 214, a display 215, a speaker 216 and a transceiver 218, and any other components.

In some implementations, the computer system 212 may be a mobile device, such as a smartphone, a tablet computer, a wristwatch, or others. In some other implementations, the computer system 212 may be a laptop computer or a desktop computer, or any other type or form of computer. In still other implementations, the computer system 212 may be, or may be a part of, a smart speaker, a television, an automobile, a media player, or any other type or form of system having one or more processors, memory or storage components (e.g., databases or other data stores), or other components.

The microphone 214 may be any sensor or system for capturing acoustic energy, including but not limited to piezoelectric sensors, vibration sensors, or other transducers for detecting acoustic energy, and for converting the acoustic energy into electrical energy or one or more electrical signals. The display 215 may be a television system, a monitor or any other like machine having a screen for viewing rendered video content, and may incorporate any number of active or passive display technologies or systems, including but not limited to electronic ink, liquid crystal displays (or "LCD"), light-emitting diode (or "LED") or organic light-emitting diode (or "OLED") displays, cathode ray tubes (or "CRT"), plasma displays, electrophoretic displays, image projectors, or other display mechanisms including but not limited to micro-electromechanical systems (or "MEMS"), spatial light modulators, electroluminescent displays, quantum dot displays, liquid crystal on silicon (or "LCOS") displays, cholesteric displays, interferometric displays or others. The display 215 may be configured to receive content from any number of sources via one or more wired or wireless connections, e.g., the control system 250, the content source 270 or the listener 280, over the networks 290.

In some implementations, the display 215 may be an interactive touchscreen that may not only display information or data but also receive interactions with the information or data by contact with a viewing surface. For example, the display 215 may be a capacitive touchscreen that operates by detecting bioelectricity from a user, or a resistive touchscreen including a touch-sensitive computer display composed of multiple flexible sheets that are coated with a resistive material and separated by an air gap, such that when a user contacts a surface of a resistive touchscreen, at least two flexible sheets are placed in contact with one another.

The speaker 216 may be any physical components that are configured to convert electrical signals into acoustic energy such as electrodynamic speakers, electrostatic speakers, flat-diaphragm speakers, magnetostatic speakers, magnetostrictive speakers, ribbon-driven speakers, planar speakers, plasma arc speakers, or any other sound or vibration emitters.

The transceiver 218 may be configured to enable the computer system 212 to communicate through one or more wired or wireless means, e.g., wired technologies such as Universal Serial Bus (or "USB") or fiber optic cable, or standard wireless protocols such as Bluetooth® or any Wireless Fidelity (or "Wi-Fi") protocol, such as over the network 290 or directly. The transceiver 218 may further include or be in communication with one or more input/output (or "I/O") interfaces, network interfaces and/or input/output devices, and may be configured to allow information or data to be exchanged between one or more of the components of the computer system 212, or to one or more other computer devices or systems (e.g., other aerial vehicles, not shown) via the network 290. The transceiver 218 may perform any necessary protocol, timing or other data transformations in order to convert data signals from a first format suitable for use by one component into a second format suitable for use by another component. In some embodiments, the transceiver 218 may include support for devices attached through various types of peripheral buses, e.g., variants of the Peripheral Component Interconnect (PCI) bus standard or the Universal Serial Bus (USB) standard. In some other embodiments, functions of the transceiver 218 may be split into two or more separate components.

In some implementations, the computer system 212 may include a common frame or housing that accommodates the microphone 214, the display 215, the speaker 216 and/or the transceiver 218. In some implementations, applications or functions or features described as being associated with the computer system 212 may be performed by a single system. In some other implementations, however, such applications, functions or features may be split among multiple systems. For example, an auxiliary system, may perform one or more of such applications or functions, or include one or more features, of the computer system 212 or other computer systems or devices described herein, and may exchange any information or data that may be associated with such applications, functions or features with the computer system 212, as necessary. Alternatively, or additionally, the computer system 212 may include one or more power supplies, sensors (e.g., visual cameras or depth cameras), feedback devices (e.g., haptic feedback systems), chips, electrodes, clocks, boards, timers or other relevant features (not shown).

In some implementations, the computer system 212 may be programmed or configured to render one or more user interfaces on the display 215 or in any other manner, e.g., by a browser or another application. The computer system 212 may receive one or more gestures or other interactions with such user interfaces, and such gestures or other interactions may be interpreted to generate one or more instructions or commands that may be provided to one or more of the control system 250, the content source 270 or the listener 280. Alternatively, or additionally, the computer system 212 may be configured to present one or more messages or information to the creator 210 in any other manner, e.g., by voice, and to receive one or more instructions or commands from the creator 210, e.g., by voice.

The control system 250 may be any single system, or two or more of such systems, that is configured to establish or terminate channels or connections with or between the creator 210, the content source 270 or the listener 280, to initiate a media program, or to control the receipt and transmission of media content from one or more of the creator 210, the content source 270 or the listener 280 to the creator 210, the content source 270 or the listener 280. The control system 250 may operate or include a networked computer infrastructure, including one or more physical computer servers 252 and data stores 254 (e.g., databases) and one or more transceivers 256, that may be associated with the receipt or transmission of media or other information or data over the network 290. The control system 250 may also be provided in connection with one or more physical or virtual services configured to manage or monitor such files, as well as one or more other functions. The servers 252 may be connected to or otherwise communicate with the data stores 254 and may include one or more processors. The data stores 254 may store any type of information or data, including media files or any like files containing multimedia (e.g., audio and/or video content), for any purpose. The servers 252 and/or the data stores 254 may also connect to or otherwise communicate with the networks 290, through the sending and receiving of digital data.

In some implementations, the control system 250 may be independently provided for the exclusive purpose of managing the monitoring and distribution of media content. Alternatively, the control system 250 may be operated in connection with one or more physical or virtual services configured to manage the monitoring or distribution of media files, as well as one or more other functions. Additionally, the control system 250 may include any type or form of systems or components for receiving media files and associated information, data or metadata, e.g., over the networks 290. For example, the control system 250 may receive one or more media files via any wired or wireless means and store such media files in the one or more data stores 254 for subsequent processing, analysis and distribution. In some embodiments, the control system 250 may process and/or analyze media files, such as to add or assign metadata, e.g., one or more tags, to media files.

The control system 250 may further broadcast, air, stream or otherwise distribute media files maintained in the data stores 254 to one or more listeners, such as the listener 280 or the creator 210, over the networks 290. Accordingly, in addition to the server 252, the data stores 254, and the transceivers 256, the control system 250 may also include any number of components associated with the broadcasting, airing, streaming or distribution of media files, including but not limited to transmitters, receivers, antennas, cabling, satellites, or communications systems of any type or form. Processes for broadcasting, airing, streaming and distribution of media files over various networks are well known to those skilled in the art of communications and thus, need not be described in more detail herein.

The content source 270 may be a source, repository, bank, or other facility for receiving, storing or distributing media content, e.g., in response to one or more instructions or commands from the control system 250. The content source 270 may receive, store or distribute media content of any type or form, including but not limited to advertisements, music, news, sports, weather, or other programming. The content source 270 may include, but need not be limited to, one or more servers 272, data stores 274 or transceivers 276, which may have any of the same attributes or features of the servers 252, data stores 254 or transceivers 256, or one or more different attributes or features.

In some embodiments, the content source 270 may be an Internet-based streaming content and/or media service provider that is configured to distribute media over the network 290 to one or more general purpose computers or computers that are dedicated to a specific purpose.

For example, in some embodiments, the content source 270 may be associated with a television channel, network or provider of any type or form that is configured to transmit media files over the airwaves, via wired cable television systems, by satellite, over the Internet, or in any other manner. The content source 270 may be configured to generate or transmit media content live, e.g., as the media content is captured in real time or in near-real time, such as following a brief or predetermined lag or delay, or in a pre-recorded format, such as where the media content is captured or stored prior to its transmission to one or more other systems. For example, the content source 270 may include or otherwise have access to any number of microphones, cameras or other systems for capturing audio, video or other media content or signals. In some embodiments, the content source 270 may also be configured to broadcast or stream one or more media files for free or for a one-time or recurring fees. In some embodiments, the content source 270 may be associated with any type or form of network site (e.g., a web site), including but not limited to news sites, sports sites, cultural sites, social networks or other sites, that streams one or more media files over a network. In essence, the content source 270 may be any individual or entity that makes media files of any type or form available to any other individuals or entities over one or more networks 290.

The listener 280 may be any individual or entity having access to one or more computer devices 282, e.g., general purpose or special purpose devices, who has requested (e.g., subscribed to) media content associated with one or more media programs over the network 290. For example, the computer devices 282 may be at least a portion of an automobile, a desktop computer, a laptop computer, a media player, a smartphone, a smart speaker, a tablet computer, a television, or a wristwatch, or any other like machine that may operate or access one or more software applications, and may be configured to receive media content, and present the media content to the listener 280 by one or more speakers, displays or other feedback devices. The computer device 282 may include a microphone 284, a display 285, a speaker 286, a transceiver 288, or any other components described herein, which may have any of the same attributes or features of the computer device 212, the microphone 214, the display 215, the speaker 216 or the transceiver 218 described herein, or one or more different attributes or features. In accordance with the present disclosure, a listener 280 that requests to receive media content associated with one or more media programs may also be referred to as a "subscriber" to such media programs or media content.

Those of ordinary skill in the pertinent arts will recognize that the computer devices 212, 282 may include any number of hardware components or operate any number of software applications for playing media content received from the control system 250 and/or the media sources 270, or from any other systems or devices (not shown) connected to the network 290.

Moreover, those of ordinary skill in the pertinent arts will further recognize that, alternatively, in some implementations, the computer device 282 need not be associated with a specific listener 280. For example, the computer device 282 may be provided in a public place, beyond the control of the listener 280, e.g., in a bar, a restaurant, a transit station, a shopping center, or elsewhere, where any individuals may receive one or more media programs.

The networks 290 may be or include any wired network, wireless network, or combination thereof, and may comprise the Internet, intranets, broadcast networks, cellular television networks, cellular telephone networks, satellite networks, or any other networks, for exchanging information or data between and among the computer systems or devices of the creator 210, the control system 250, the media source 270 or the listener 280, or others (not shown). In addition, the network 290 may be or include a personal area network, local area network, wide area network, cable network, satellite network, cellular telephone network, or combination thereof, in whole or in part. The network 290 may also be or include a publicly accessible network of linked networks, possibly operated by various distinct parties, such as the Internet. The network 290 may include one or more wireless networks, such as a Global System for Mobile Communications (GSM) network, a Code Division Multiple Access (CDMA) network, a Long-Term Evolution (LTE) network, or some other type of wireless network. Protocols and components for communicating via the Internet or any of the other aforementioned types of communication networks are well known to those skilled in the art of computer communications and thus, need not be described in more detail herein.

Although the system 200 shown in FIG. 2A shows boxes for one creator 210, one control system 250, one media source 270, one listener 280, and one network 290, those of ordinary skill in the pertinent arts will recognize that any number of creators 210, broadcast systems 250, media sources 270, listeners 280 or networks 290 may be utilized to transmit, receive, access, hear, or view media content provided in accordance with implementations of the present disclosure. Moreover, the computer devices 212, 252, 272, 282 may include all or fewer of the components shown in FIG. 2A or perform all or fewer of the tasks or functions described herein. Tasks or functions described as being executed or performed by a single system or device associated with the creator 210, the control system 250, the media source 270 or the listener 280 may be executed or performed by multiple systems or devices associated with each of the creator 210, the control system 250, the media source 270 or the listener 280. For example, the tasks or functions described herein as being executed or performed by the control system 250 may be performed by a single system, or by separate systems for establishing two-way connections with the creator 210 or any number of media sources 270, or any other systems, e.g., a mixing system, or for establishing one-way connections with any number of media sources 270 or any number of listeners 280 and transmitting data representing media content, e.g., a broadcast system, from such media sources 270 to such listeners 280. Moreover, two or more creators 210 may collaborate on the construction of a media program.

In some implementations, one or more of the tasks or functions described as being executed or performed by the control system 250 may be performed by multiple systems. For example, as is shown in FIG. 2B, the system 200 may include a mixing system 250-1, a conference system 250-2 and a broadcast system 250-3 that may perform one or more of the tasks or functions described herein as being executed or performed by the control system 250.

As is further shown in FIG. 2B, the mixing system 250-1 may be configured to receive data from the conference system 250-2, as well as from one or more content sources 270. For example, in some implementations, the conference system 250-2 may also be configured to establish two-way communications channels with computer devices or systems associated with the creator 210 (or any number of creators) as well as a listener 280-2 (or any number of listeners) or other authorized host, guests, or contributors to a media program associated with one or more of the creators 210, and form a "conference" including each of such devices or systems. The conference system 250-2 may receive data representing media content such as audio signals in the form of words spoken or sung by one or more of the creator 210, the listener 280-2, or other entities connected to the conference system 250-2, or music or other media content played by the one or more of the creator 210, the listener 280-2, or such other entities, and transmit data representing the media content or audio signals to each of the other devices or systems connected to the conference system 250-2.

In some implementations, the mixing system 250-1 may also be configured to establish a two-way communications channel with the conference system 250-2, thereby enabling the mixing system 250-1 to receive data representing audio signals from the conference system 250-2, or transmit data representing audio signals to the conference system 250-2. For example, in some implementations, the mixing system 250-1 may act as a virtual participant in a conference including the creator 210 and any listeners 280-2, and may receive data representing audio signals associated with any participants in the conference, or provide data representing audio signals associated with media content of the media program, e.g., media content received from any of the content sources 270, to such participants.

The mixing system 250-1 may also be configured to establish a one-way communications channel with the content source 270 (or with any number of content sources), thereby enabling the mixing system 250-1 to receive data representing audio signals corresponding to advertisements, songs or media files, news programs, sports programs, weather reports or any other media files, which may be live or previously recorded, from the content source 270. The mixing system 250-1 may be further configured to establish a one-way communications channel with the broadcast system 250-3, and to transmit data representing media content received from the creator 210 or the listener 280-2 by way of the conference channel 250-2, or from any content sources 270, to the broadcast system 250-3 for transmission to any number of listeners 280-1.

The mixing system 250-1 may be further configured to receive information or data from one or more devices or systems associated with the creator 210, e.g., one or more instructions for operating the mixing system 250-1. For example, in some implementations, the mixing system 250-1 may be configured to cause any number of connections to be established between devices or systems and one or more of the conference system 250-2 or the broadcast system 250-3, or for causing data representing media content of any type or form to be transmitted to one or more of such devices or systems in response to such instructions. In some implementations, the mixing system 250-1 may also be configured to initiate or modify the playing of media content, such as by playing, pausing or stopping the media content, advancing (e.g., "fast-forwarding") or rewinding the media content, increasing or decreasing levels of volume of the media content, or setting or adjusting any other attributers or parameters (e.g., treble, bass, or others) of the media content, in response to such instructions or automatically.

The broadcast system 250-3 may be configured to establish one-way communications channels with any number of listeners 280-1, and to transmit data representing media content received from the mixing system 250-1 to each of such listeners 280-1.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

The computer devices 212, 282 or the servers 252, 272, and any associated components, may use any web-enabled or Internet applications or features, or any other client-server applications or features including E-mail or other messaging techniques, to connect to the networks 290, or to communicate with one another, such as through short or multimedia messaging service (SMS or MMS) text messages. For example, the computer devices 212, 282 or the servers 252, 272 may be configured to transmit information or data in the form of synchronous or asynchronous messages to one another in real time or in near-real time, or in one or more offline processes, via the networks 290. Those of ordinary skill in the pertinent art would recognize that the creator 210, the control system 250 (or the mixing system 250-1, the conference system 250-2, or the broadcast system 250-3), the media source 270 or the listener 280 (or the listeners 280-1, 280-2) may include or operate any of a number of computing devices that are capable of communicating over the networks 290. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as computer devices 212, 282 or the servers 252, 272, or to any other computers or control systems utilized by the creator 210, the control system 250 (or the mixing system 250-1, the conference system 250-2, or the broadcast system 250-3), the media source 270 or the listener 280 (or the listeners 280-1, 280-2), and having sequences of instructions which, when executed by a processor (e.g., a central processing unit, or "CPU"), cause the processor to perform all or a portion of the functions, services and/or methods described herein. Such computer executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage media of the present disclosure may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks, e.g., the network 290.

Figure 3:
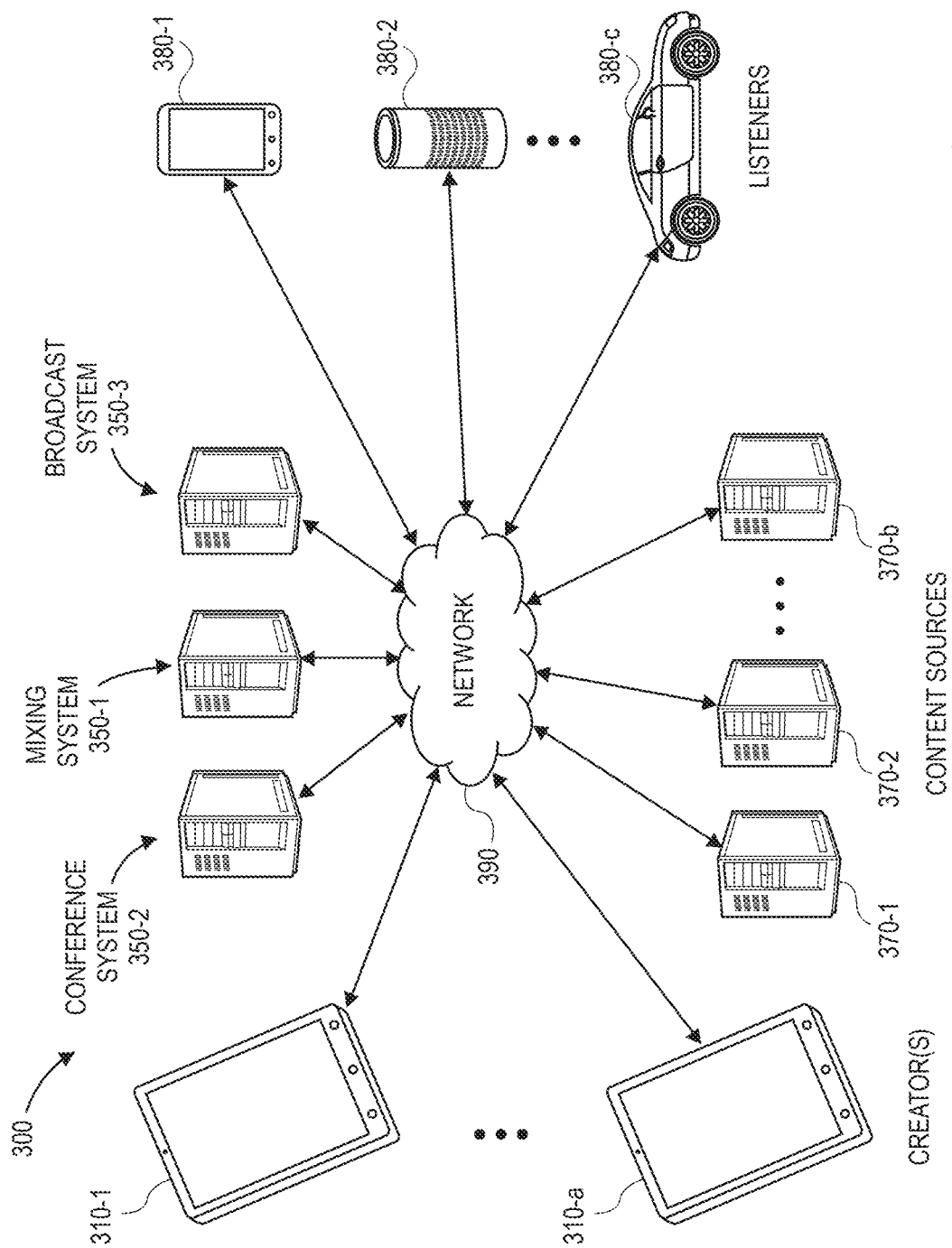
FIG. 3 is a view of aspects of one system for playing media in accordance with embodiments of the present disclosure.

Referring to FIG. 3, a view of aspects of one system for playing media in accordance with embodiments of the present disclosure is shown. Except where otherwise noted, reference numerals preceded by the number "3" shown in FIG. 3 indicate components or features that are similar to components or features having reference numerals preceded by the number "2" shown in FIG. 2A or FIG. 2B or by the number "1" shown in FIGS. 1A through 1E. As is shown in FIG. 3, the system 300 includes computer systems or devices of a plurality of creators 310-1 . . . 310-*a*, a mixing system 350-1, a conference system 350-2, a broadcast system 350-3, a plurality of content sources 370-1, 370-2 . . . 370-*b* and a plurality of listeners 380-1, 380-2 . . . 380-*c* that are connected to one another over a network 390, which may include the Internet in whole or in part.

The creators 310-1 . . . 310-*a* may operate a computer system or device having one or more microphones, an interactive display, one or more speakers, one or more processors and one or more transceivers configured to enable communication with one or more other computer systems or devices. In some implementations, the creators 310-1 . . . 310-*a* may operate a smartphone, a tablet computer or another mobile device, and may execute interactions with one or more user interfaces rendered thereon, e.g., by a mouse, a stylus, a touchscreen, a keyboard, a trackball, or a trackpad, as well as any voice-controlled devices or software (e.g., a personal assistant). Interactions with the user interfaces may be interpreted and transmitted in the form of instructions or commands to the mixing system 350-1, the conference system 350-2 or the broadcast system 350-3. Alternatively, the creators 310-1 . . . 310-*a* may operate any other computer system or device, e.g., a laptop computer, a desktop computer, a smart speaker, a media player, a wristwatch, a television, an automobile, or any other type or form of system having one or more processors, memory or storage components (e.g., databases or other data stores), or other components.

Additionally, the mixing system 350-1 may be any server or other computer system or device configured to receive information or data from the creators 310-1 . . . 310-*a*, or any of the listeners 380-1, 380-2 . . . 380-*c*, e.g., by way of the conference system 350-2, or from any of the media sources 370-1, 370-2 . . . 370-*b* over the network 390. The mixing system 350-1 may be further configured to transmit any information or data to the broadcast system 350-3 over the network 390, and to cause the broadcast system 350-3 to transmit any of the information or data to any of the listeners 380-1, 380-2 . . . 380-*c*, in accordance with a broadcast plan (or a sequence of media content, or another schedule), or at the direction of the creators 310-1 . . . 310-*a*. The mixing system 350-1 may also transmit or receive information or data along such communication channels, or in any other manner. The operation of the mixing system 350-1, e.g., the establishment of connections, or the transmission and receipt of data via such connections, may be subject to the control or discretion of any of the creators 310-1 . . . 310-*a*.

In some implementations, the mixing system 350-1 may receive media content from one or more of the media sources 370-1, 370-2 . . . 370-*b*, and cause the media content to be transmitted to one or more of the creators 310-1 . . . 310-*a* or the listeners 380-1, 380-2 . . . 380-*c* by the broadcast system 350-3. In some other implementations, the mixing system 350-1 may receive media content from one or more of the media sources 370-1, 370-2 . . . 370-*b*, and mix, or combine, the media content with any media content received from the creators 310-1 . . . 310-*a* or any of the listeners 380-1, 380-2 . . . 380-*c*, before causing the media content to be transmitted to one or more of the creators 310-1 . . . 310-*a* or the listeners 380-1, 380-2 . . . 380-*c* by the conference system 350-2 or the broadcast system 350-3. For example, in some implementations, the mixing system 350-1 may receive media content (e.g., audio content and/or video content) captured live by one or more sensors of one or more of the media sources 370-1, 370-2 . . . 370-*b*, e.g., cameras and/or microphones provided at a location of a sporting event, or any other event, and mix that media content with any media content received from any of the creators 310-1 . . . 310-*a* or any of the listeners 380-1, 380-2 . . . 380-*c*. In such embodiments, the creators 310-1 . . . 310-*a* may act as sportscasters, news anchors, weathermen, reporters or others, and may generate a media program that combines audio or video content captured from a sporting event or other event of interest, along with audio or video content received from one or more of the creators 310-1 . . . 310-*a* or any of the listeners 380-1, 380-2 . . . 380-*c* before causing the media program to be transmitted to the listeners 380-1, 380-2 . . . 380-*c* by the conference system 350-2 or the broadcast system 350-3.

In some implementations, the conference system 350-2 may establish two-way communications channels between any of the creators 310-1 . . . 310-*a* and, alternatively, any of the listeners 380-1, 380-2 . . . 380-*c*, who may be invited or authorized to participate in a media program, e.g., by providing media content in the form of spoken or sung words, music, or any media content, subject to the control or discretion of the creators 310-1 . . . 310-*a*. Devices or systems connected to the conference system 350-2 may form a "conference" by transmitting or receiving information or data along such communication channels, or in any other manner. The operation of the mixing system 350-1, e.g., the establishment of connections, or the transmission and receipt of data via such connections, may be subject to the control or discretion of the creators 310-1 . . . 310-*a*. In some implementations, the mixing system 350-1 may effectively act as a virtual participant in such a conference, by transmitting media content received from any of the media sources 370-1, 370-2 . . . 370-*b* to the conference system 350-2 for transmission to any devices or systems connected thereto, and by receiving media content from any of such devices or systems by way of the conference system 350-2 and transmitting the media content to the broadcast system 350-3 for transmission to any of the listeners 380-1, 380-2 . . . 380-*c*.

Likewise, the broadcast system 350-3 may be any server or other computer system or device configured to receive information or data from the mixing system 350-1, or transmit any information or data to any of the listeners 380-1, 380-2 . . . 380-*c* over the network 390. In some implementations, the broadcast system 350-3 may establish one-way communications channels with the mixing system 350-1 or any of the listeners 380-1, 380-2 . . . 380-*c* in accordance with a broadcast plan (or a sequence of media content, or another schedule), or at the direction of the creators 310-1 . . . 310-*a*. The broadcast system 350-3 may also transmit or receive information or data along such communication channels, or in any other manner. The operation of the broadcast system 350-3, e.g., the establishment of connections, or the transmission of data via such connections, may be subject to the control or discretion of the creators 310-1 . . . 310-*a*.

The content sources 370-1, 370-2 . . . 370-*b* may be servers or other computer systems having media content stored thereon, or access to media content, that are configured to transmit media content to the creators 310-1 . . . 310-*a* or any of the listeners 380-1, 380-2 . . . 380-*c* in response to one or more instructions or commands from the creators 310-1 . . . 310-*a* or the mixing system 350-1. The media content stored on or accessible to the content sources 370-1, 370-2 . . . 370-*b* may include one or more advertisements, songs or media files, news programs, sports programs, weather reports or any other media files, which may be live or previously recorded. The number of content sources 370-1, 370-2 . . . 370-*b* that may be accessed by the mixing system 350-1, or the types of media content stored thereon or accessible thereto, is not limited.

The listeners 380-1, 380-2 . . . 380-*c* may also operate any type or form of computer system or device configured to receive and present media content, e.g., at least a portion of an automobile, a desktop computer, a laptop computer, a media player, a smartphone, a smart speaker, a tablet computer, a television, or a wristwatch, or others.

The mixing system 350-1, the conference system 350-2 or the broadcast system 350-3 may establish or terminate connections with the creators 310-1 . . . 310-*a*, with any of the content sources 370-1, 370-2 . . . 370-*b*, or with any of the listeners 380-1, 380-2 . . . 380-*c*, as necessary, to compile and seamlessly transmit media programs over digital channels (e.g., web-based or application-based), to devices of the creators 310-1 . . . 310-*a* or the listeners 380-1, 380-2 . . . 380-*c* in accordance with a broadcast plan, or subject to the control of the creators 310-1 . . . 310-*a*. Furthermore, in some implementations, one or more of the listeners 380-1, 380-2 . . . 380-*c*, e.g., musicians, celebrities, personalities, athletes, politicians, or artists, may also be content sources. For example, where the broadcast system 350-3 has established one-way channels, e.g., broadcast channels, with any of the listeners 380-1, 380-2 . . . 380-*c*, the mixing system 350-1 may terminate one of the one-way channels with one of the listeners 380-1, 380-2 . . . 380-*c*, and cause the conference system 350-2 to establish a two-directional channel with that listener, thereby enabling that listener to not only receive but also transmit media content to the creators 310-1 . . . 310-*a* or any of the other listeners.

Those of ordinary skill in the pertinent arts will recognize that any of the tasks or functions described above with respect to the mixing system 350-1, the conference system 350-2 or the broadcast system 350-3 may be performed by a single device or system, e.g., a control system, or by any number of devices or systems.

Figure 4:
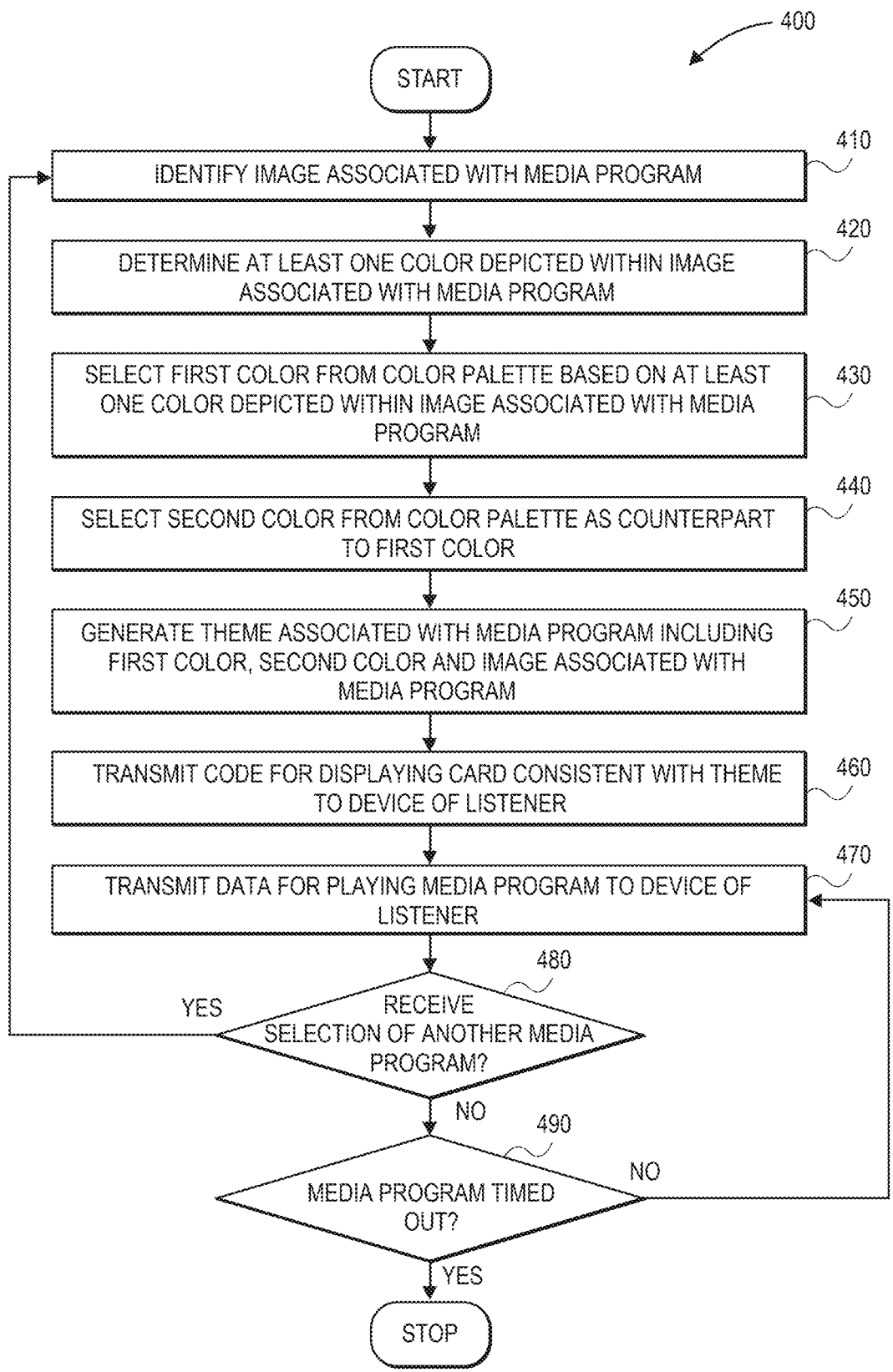
FIG. 4 is a flow chart of one process for generating an application for playing media in accordance with embodiments of the present disclosure.

User interfaces (e.g., pages, cards, windows or other interfaces) that are generated in a manner consistent with a visual theme may be displayed by applications for playing media, or any other applications, for any purpose associated with a media program. Referring to FIG. 4, a flow chart 400 of one process for playing media in accordance with embodiments of the present disclosure is shown.

At box 410, an image associated with a media program is identified. The media program may include one or more episodes or other sets of media content generated by a creator, or two or more creators, and may feature music, comedy, "talk" radio, interviews or any other content, such as advertisements, news, sports, weather, or other programming. The media program may be offered at a regularly scheduled time, or at any other time, e.g., randomly or spontaneously. The media program may have been requested at any time by a listener, or recommended for the listener on any basis. For example, in some implementations, the media program may be recommended to a listener based on any similarity between one or more of a creator, a genre, a subject, a theme, a title or a topic of the media program, and a creator, a genre, a subject, a theme, a title or a topic of another media program to which the listener has already listened, or of which the listener is believed to have an interest. Alternatively, or additionally, the media program may be recommended to a listener for any other reason, such as a similarity between the listener and another listener who has also listened to the media program, or who is believed to have an interest in the media program, which may be determined on any basis. The media program may also be recommended to a listener as particularly timely or relevant to the listener, e.g., based on current events, or emerging interests of listeners who are believed to be similarly situated to the listener, or on any other basis.

The image may be any visual image having any visual attributes that bear any relation to the media program. In some implementations, the image may be an image depicting at least a portion of a creator of the media program, e.g., a face of the creator. Alternatively, the image may be any other image having any other relation to the media program or the creator, e.g., an avatar representing the creator, or any other image selected by or identified for the creator. The image may be any other image associated with the media program, e.g., an image depicting another individual (such as a guest or a listener), a symbol, a logo, an icon, a flag, or any other item or feature of the media program.

Moreover, the image may be obtained or otherwise identified from any source. In some implementations, the image may have been obtained from a mobile device of the creator, or from any other component having a camera that is otherwise associated with the creator. In some other implementations, the image may have been obtained from any device or system that may but need not be associated with the creator.

At box 420, at least one color depicted within the image is determined. For example, in some implementations, a histogram (e.g., a color histogram) or another analysis of the image may be performed, and one or more predominant or otherwise noteworthy colors represented within the image may be identified. Colors that are frequently depicted within the image, e.g., with great regularity or predominance, may be identified. Alternatively, a color may be selected on any other basis. For example, where large or substantial portions of an image depict bland, neutral or ordinary colors, and small or insignificant portions of the image depict bright, vivid or striking colors, one or more of the bright, vivid or striking colors may be identified.

At box 430, a first color is selected from a color palette based at least in part on the at least one color depicted within the image determined at box 420. For example, a color palette may include a finite set of colors that may be available for depiction in a card rendered within a user interface, and may be determined or quantified according to one or more standards, e.g., an RGB color model, a hexadecimal model, or any other model for quantifying a color or color schema within an image. The color palette may feature or include any number of colors in accordance with implementations of the present disclosure.

The first color may be based on an extent of similarity or proximity to the at least one color determined at box 420. For example, where the at least one color determined from the image is a shade of blue, and the color palette includes seven colors, one of which is a blue, the blue may be selected as the first color based on the similarity of blue to the shade of blue determined from the image. Similarity or proximity to colors of the color palette may be determined in any manner and on any basis in accordance with implementations of the present disclosure.

At box 440, a second color is selected from the color palette, e.g., as a counterpart to the first color. In some implementations, the second color may be selected based on a level of contrast between the second color and the first color selected at box 430. For example, the second color may be complementary to the first color, analogous to the first color, one of the triadic colors to the first color, one of the tetradic colors to the first color, or have any other relation to the first color.

At box 450, a theme associated with the media program and comprising a first color, a second color, and the image associated with the media program is generated. For example, a visual theme may designate or specify colors, images or other features that are to be utilized in generating and displaying any type or form of user interfaces (e.g., pages, cards, windows or others) associated with the media program. Colors, images or other features of a visual theme may be utilized in generating or displaying user interfaces for any purpose. For example, a visual theme generated for a media program may designate or specify colors, images or features to be included in a card generally associated with a media program, e.g., a card displayed by an application with cards of other media programs that a listener may scroll through or otherwise evaluate prior to selecting one of the media programs associated with one of the cards, as well as a card to be displayed by an application while a selected media program is playing, a card displayed while a creator is establishing a media program, or any other card. Moreover, cards (or pages, windows or other user interfaces) that are generated in accordance with implementations of the present disclosure may include sections of any size, shape or dimension, and with colors, images or features in accordance with the visual theme.

In some implementations, a user interface may include an upper section in the first color, and a lower section in the second color, along with a section including the image provided within or between either the upper section or the lower section, or on a divider or boundary between the upper section or the lower section, such as where a card is intended to be displayed on a device in a substantially vertical (or "portrait" orientation).

In some implementations, the first section and the second section may have substantially the same sizes or shapes. In some implementations, the third section including the image may have the same shape as the image. Alternatively, in some implementations, the third section and the image may have different shapes. For example, referring again to FIG. 1A, the image 128 has a circular shape and is shown in a section in the third color $C_{1-3}$ having a square shape that is provided on a divider or boundary between an upper section in the first color $C_{1-1}$ and a lower section in the second color $C_{1-2}$. Furthermore, in some implementations, a user interface may include a section having a background in one or more portions that are bland, neutral or ordinary colors, or colors other than the first color determined at box 430 or the second color determined at box 440. Alternatively, in some implementations, the user interface may include a section that has a background in the second color, and a section having one or more portions that are bland, neutral or ordinary colors.

A visual theme may also designate or specify that a user interface include any other information or data regarding the media program, or designate or specify locations where such information or data is to be displayed in the user interface. For example, in some implementations, a theme may designate or specify that a user interface include an identifier of the media program or of an episode of the media program, as well as an identifier of a creator, a guest, or another participant in the media program, or any identifiers (e.g., sets of text or tags) associated with one or more aspects of the media program, as well as interactive features for initiating or performing any function upon a selection by a listener.

At box 460, code for displaying a card consistent with the theme is transmitted to a device of a listener. For example, in some implementations, the code may be programmed in one or more languages, such as HTML or any other language, e.g., Java or JavaScript, and may be configured for execution by a widget, an application programming interface (or "API"), or any other application or feature of a device. The code may outline, describe or define a logical structure of the card, including locations or attributes of one or more sections or features of the card, as well as any colors of such sections or features, consistent with the theme.

At box 470, data for playing the media program is transmitted to the device of the listener. For example, in some implementations, the data may include audio data in any format and in any file sizes, durations, numbers of channels, intensities, sampling rates, bit depths or other attributes. The data may be transmitted or streamed from a system that generated the theme at box 450 or transmitted the code at box 460, e.g., a control system, or from any other system, such as a repository, a catalog, or another source. In some implementations, the media program may begin playing on the device of the listener upon a receipt of the data, e.g., in real time or in near-real time, or at a later time. Alternatively, such as where the card includes one or more interactive features for selecting or receiving the media program, the code for displaying the card may be transmitted to the device of the listener independent of the data for playing the media program, or at a later time, e.g., upon a request of the listener. Moreover, the device of the listener may play the media program with the card displayed thereon, or with any other information or data displayed thereon, such as another user interface, which may be consistent with the theme, or include any colors or features that may but need not be associated with any other theme.

At box 480, whether a selection of another media program is received from the device of the listener is determined. For example, where the card associated with the media program is displayed by an application operating on a device of a listener based on the code transmitted at box 460, a listener may decline to hear the media program, or select another media program by one or more gestures or other interactions with a general-purpose application (e.g., a browser) or a dedicated application on the device. Alternatively, the listener may select another media program by way of one or more voice commands or utterances to a component or application configured to capture and interpret such commands or utterances, e.g., a smart speaker.

If a selection of another media program is received, then the process returns to box 410, where an image associated with the other media program is identified.

If a selection of another media program is not received, however, then the process advances to box 490, where whether the media program has timed out is determined. If the media program has timed out, then the process ends. If the media program has not timed out, however, then the process returns to box 470, where data for playing the media program is transmitted to the device of the listener.

Figure 5A:
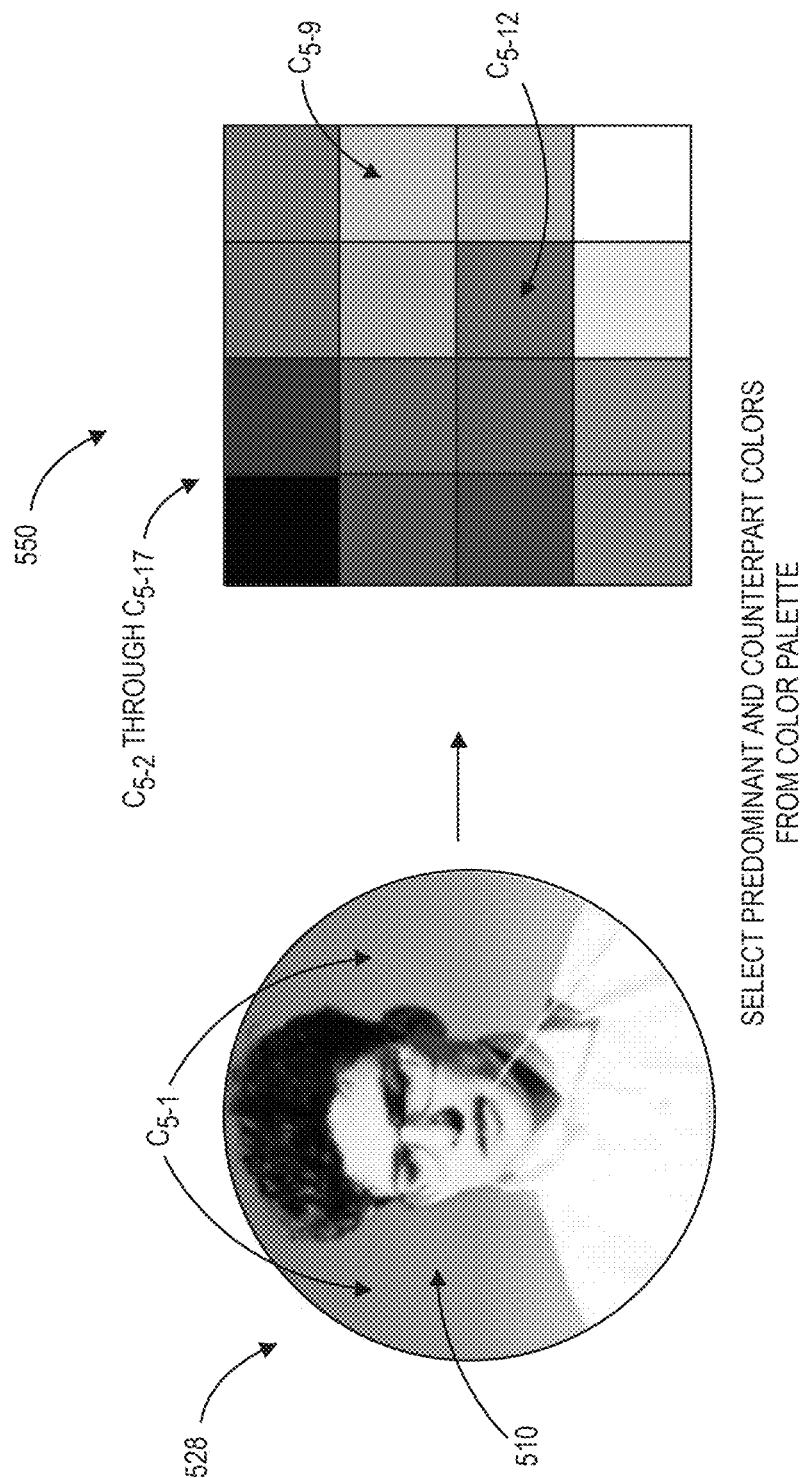
FIGS. 5A and 5B are views of aspects of one system for playing media in accordance with embodiments of the present disclosure.
Figure 5B:

As is discussed above, colors may be selected from a color palette for inclusion in a visual theme associated with a media program. Referring to FIGS. 5A and 5B, views of aspects of one system for playing media in accordance with embodiments of the present disclosure are shown. Except where otherwise noted, reference numerals preceded by the number "5" shown in FIG. 5A or 5B indicate components or features that are similar to components or features having reference numerals preceded by the number "3" shown in FIG. 3, by the number "2" shown in FIG. 2A or FIG. 2B or by the number "1" shown in FIGS. 1A through 1E.

As is shown in FIG. 5A, an image 528 depicts a facial or frontal view of the creator 510 of a media program. Alternatively, the image 528 may be an avatar representing the creator 510, or any other image associated with the media program, e.g., an individual (such as a guest or a listener), a symbol, a logo, an icon, a flag, or any other item or feature of the media program, and need not depict the creator 510.

The image 528 includes substantial regions or portions having a color $C_{5-1}$ that is a light shade of blue, e.g., background features surrounding or adjacent to a face of the creator 510. The color $C_{5-1}$ may be identified based on a histogram or another representation of the image 528, which may identify a distribution of colors, e.g., numbers of pixels of the image 528 that include or correspond to one or more of a plurality of colors, or are within predetermined ranges of colors. Alternatively, a color depicted within the image 528 that is noteworthy with respect to other portions of the image 528, e.g., a particularly bright, vivid or striking color of the image 528, as compared to other colors within the image 528, may be selected.

As is also shown in FIG. 5A, a color palette 550 includes a plurality of colors $C_{5-2}$ through $C_{5-17}$. The color palette 550 may include a finite set of colors, viz., the sixteen colors $C_{5-2}$ through $C_{5-17}$, that may be available for depiction in a page, a card, a window or another user interface, and may be determined or quantified according to one or more standards for quantifying a color or color schema within an image. Although the color palette 550 of FIG. 5A includes the sixteen colors $C_{5-2}$ through $C_{5-17}$, a color palette may feature or include any number of colors in accordance with implementations of the present disclosure. Moreover, the colors of a color palette may be displayed in a round (or circular) format, such as a color wheel, or in any other format.

As is further shown in FIG. 5A, a predominant color $C_{5-9}$ (or a first color) is selected from the color palette 550 based on the color $C_{5-1}$. The predominant color $C_{5-9}$ may be selected based on a similarity or proximity to the color $C_{5-1}$ identified or selected from the image 528, e.g., a closest, nearest or most similar color of the colors $C_{5-2}$ through $C_{5-17}$ of the color palette 550 to the color $C_{5-1}$.

Additionally, as is also shown in FIG. 5A, a counterpart color $C_{5-12}$ (or a second color) is selected from the color palette 550 based on the predominant color $C_{5-9}$. The counterpart color $C_{5-12}$ may be identified or selected to specifically contrast with the counterpart color $C_{5-12}$, on any basis. In some implementations, the counterpart color $C_{5-12}$ may be a complement to the predominant color $C_{5-9}$, analogous to the predominant color $C_{5-9}$, a triadic color to the predominant color $C_{5-9}$, a tetradic color to the predominant color $C_{5-9}$, or have any other relation to the predominant color $C_{5-9}$.

As is discussed above, a user interface (e.g., a page, a card, a window or another interface) corresponding to a media program may be generated for presentation in a user interface in a manner consistent with the visual theme, including an image associated with the media program and colors selected from a color palette based on one or more colors of the image. As is shown in FIG. 5B, a user interface 520 is rendered by a mobile device 582 in a display 585. The user interface 520 includes a first section 522 in the predominant color $C_{5-9}$, a second section 524 in a white or neutral color, and a third section 526 surrounding the image 528, where the third section 526 includes a frame in the counterpart color $C_{5-12}$. Subsequently, where a listener requests to receive the media program via the mobile device 582, data representing the media program may be transmitted to the mobile device 582 and played thereon.

Moreover, any other user interfaces associated with the same media program may feature one or more of the predominant color $C_{5-9}$, or the counterpart color $C_{5-12}$, along with any other colors or features. For example, where a listener selects any portion of the user interface 520 shown in FIG. 5B, and indicates an interest in playing the media program on the mobile device 582, another user interface, such as the user interface 120-2 or the user interface 120-3, may be rendered by the mobile device 582 with the predominant color $C_{5-9}$ in the first section 122, the counterpart color $C_{5-12}$ in the second section 124, and the image 528 in lieu of the image 128, on a dividing line between the first section 122 and the second section 124.

Figure 6:
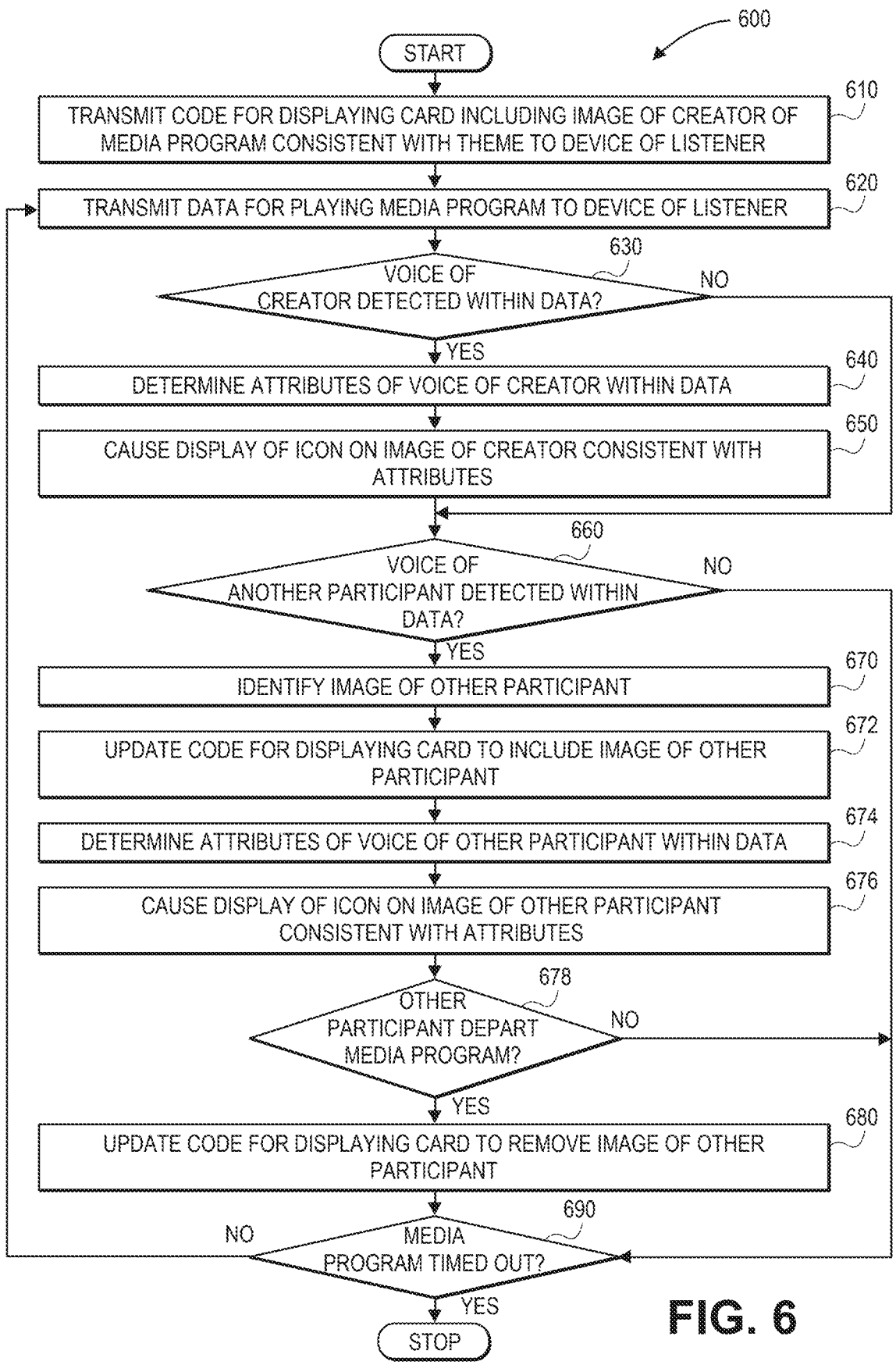
FIG. 6 is a flow chart of one process for playing media in accordance with embodiments of the present disclosure.

As is further discussed above, user interfaces (e.g., pages, cards, windows or other interfaces) for playing media programs may include one or more visual identifiers such as icons that may be used to identify a participant such as a creator, a guest, a listener, or another participant who is currently speaking during a media program. The visual identifiers may include one or more features that identify or represent attributes of audio data of the media program, e.g., frequencies, intensities, speech rates or others, and associate such audio data or attributes with one or more of the participants. Referring to FIG. 6, a flow chart 600 of one process for playing media in accordance with embodiments of the present disclosure is shown.

At box 610, code for displaying a card including an image of a creator of a media program in a manner consistent with a theme is transmitted to a device of a listener. For example, the code may include information or data for causing a display of a card or another user interface that includes the image of the creator, along with any other information or data regarding the media program, in accordance with a visual theme. In some implementations, the card may include one section having a color selected from a color palette based on one or more colors depicted within the image, and another section having a different color selected based on that color. In some other implementations, the card may further include information or data identifying the media program or the creator. In still other implementations, where the media program is being aired live at a time that the code is transmitted to the device of the listener, the card may also identify a number of listeners who are then listening to the media program, or a number of listeners who have expressed approval of the media program, e.g., by one or more interactions with the card or other user interfaces rendered on their respective devices, or in any other manner. Alternatively, in some other implementations, where the media program is not being aired live at the time that the code is transmitted to the device of the listener, the card may indicate a date or a time that the media program will be aired in the future, or include one or more interactive features (e.g., buttons) that, when selected by the listener, will cause one or more previously aired media programs to be transmitted to the device of the listener, or will create one or more electronic files or records, e.g., in a calendar or another system, that will remind the listener at a time when the media program is aired in the future, and recommend that the listener begin listening to the media program at that time, or otherwise cause the media program to be transmitted to the device of the listener at that time.

The image may have been received from the creator of the media program, or retrieved or otherwise obtained from any other source. The image may be an actual image of the creator or, alternatively, an avatar representing the creator, or any other image selected by or identified for the creator. Alternatively, the image may be any other image associated with the media program, e.g., an individual (such as a guest or a listener), a symbol, a logo, an icon, a flag, or any other item or feature of the media program, and need not depict the creator.

Any of the information or data displayed in the card may be included as a requirement of or in accordance with a visual theme, or for any other reason, e.g., upon a request or a designation of a creator of the media program, in accordance with a rule or requirement of a control system with which the media program is associated, or on any other basis.

At box 620, data for playing the media program is transmitted to the device of the listener. The data may be streamed to the media program in any manner, e.g., over one or more networks via a wired or wireless connection, and at any speed or level of quality, in any format or according to any standards. Moreover, the data may be transmitted to the device of the listener with the card displayed thereon, or with any other information or data displayed thereon, or no information or data displayed thereon.

At box 630, whether a voice of the creator is detected within the data is determined. For example, the voice of the creator may be identified or detected by partitioning the data or a transcript derived from the data into segments corresponding to different speakers, e.g., by one or more speaker diarization techniques, which may determine that one or more words or phrases of the transcript are in a number of different, individual voices, or spoken by a number of different, individual speakers. In some implementations, a voice of a creator may be identified based on information regarding statuses or configurations of devices of respective participants at various times during the transmission of media content, such as times at which microphones or other acoustic sensors are muted or are operational, or times at which communications channels have been established between such devices. Likewise, a voice of a creator may be identified based on relative intensities or energies of acoustic signals received from devices of participants in the media program, including a device of the creator or devices of any other participants.

If the voice of the creator is detected within the data, then the process advances to box 640, where one or more attributes of the voice of the creator within the data are determined. Such attributes may include, but need not be limited to, frequencies, intensities, sound pressure levels, speech rates, or others.

At box 650, an icon is caused to be displayed on the image of the creator consistent with the attributes of the voice of the creator. For example, the icon may be a visible ring or other marking or indication that may be displayed in association with the image of the creator, to visibly indicate that the creator is speaking. In some implementations, the icon may include one or more visible attributes, such as colors, sizes, dimensions, shapes, or others, that are selected based on the attributes of the voice of the creator. For example, one color (e.g., red) of the icon may be selected where a frequency, an intensity, a sound pressure level, or a speech rate of the voice of the creator is high, while another color of the icon (e.g., green or blue) may be selected where the frequency, the intensity, the sound pressure level, or the speech rate of the voice of the creator is low. Alternatively, the icon may have one size (e.g., a comparatively large size) where a frequency, an intensity, a sound pressure level, or a speech rate of the voice of the creator is high, and another size (e.g., a comparatively small size) where the frequency, the intensity, the sound pressure level, or the speech rate of the voice of the creator is low. Any other variation in a visual attribute of the icon or another marking or indication may be selected on any basis.

In some implementations, visual attributes of the icon may be varied based on changes in the voice of the creator. For example, where a frequency, an intensity, a sound pressure level, or a speech rate of the voice of the creator increases or decreases while the creator speaks, a visual attribute of the icon (e.g., a color, a size, a dimension, a shape or any other attribute) may be varied accordingly. Furthermore, in some implementations, the icon may be of any color, size, dimension or shape, and need not be limited to multi-colored circular rings. Moreover, the icon may be displayed in any location or orientation with respect to the image of the creator (or any other aspect of the media program), and need not be displayed over or around the image.

At box 660, after the icon has been caused to be displayed on the image of the creator at box 650, or after the voice of the creator is not detected within the data at box 630, where whether a voice of another participant is detected within the data is determined, e.g., by one or more speaker diarization techniques, which may be used to identify the voice based on attributes of the data, statuses or configurations of devices of participants at various times, statuses of communications channels between devices, relative intensities or energies of acoustic signals received from devices, or in any other manner.

If a voice of another participant is detected, then the process advances to box 670, where an image of the other participant is identified. The image may be identified in any manner, and may be an actual image of the other participant, an avatar of the other participant, or any other image representative of the other participant, which may be selected by the participant, by the creator, or by any other entity associated with the media program.

At box 672, the code for displaying the card is updated to include the image of the other participant identified at box 670. For example, the code may be updated to include one or more references to the image of the other participant, as well as any associated references, tags or other sets of code.

At box 674, one or more attributes of the voice of the other participant are determined from the data. As is discussed above with regard to box 640, the one or more attributes may include, but need not be limited to, frequencies, intensities, sound pressure levels, speech rates, or others.

At box 676, an accent icon is caused to be displayed on the image of the other participant, consistent with the attributes of the voice of the other participant determined at box 674. For example, the accent icon may have the same colors, sizes, dimensions, shapes or other attributes as the accent icon that was caused to be displayed on the image of the creator at box 650, or one or more different colors, sizes, dimensions, shapes or other attributes. Furthermore, the colors, sizes, dimensions, shapes or other attributes of the accent icon that is caused to be displayed on the image of the other participant may be selected in the same manner as the colors, sizes, dimensions, shapes or other attributes of the accent icon that was caused to be displayed on the image of the creator at box 650 and described above, or in any other manner.

At box 678, whether the other participant has departed the media program is determined. For example, when a participant joins the media program, one or more two-way connections or bidirectional communications channels may be established between a control system (or another system) associated with the media program and a device of the other participant. Therefore, a departure of the other participant may be determined where the two-way connections or bidirectional communications channels have been disestablished or otherwise terminated or closed. If the other participant has departed the media program, then the process advances to box 680, where code for displaying the card is updated to remove the image of the other participant.

If the other participant has not departed the media program, or after the code for displaying the card has been updated to remove the image of the other participant, then the process advances to box 690, where whether the media program has timed out, or otherwise reached a conclusion, is determined. For example, a media program may conclude when a previously scheduled time of conclusion has been reached, when the media program has been aired for a previously established duration, or upon an action by the creator or any other entity. If the media program has not timed out or otherwise concluded, then the process returns to box 620, where data for playing the media program is transmitted to the device of the listener. If the media program has timed out or otherwise concluded, however, then the process ends.

Themes for generating or rendering user interfaces of applications for playing media programs in accordance with implementations of the present disclosure may be modified or varied, as necessary, to generate any number or type of user interfaces based on a status of the media program or in response to any interactions received from the listener. Referring to FIGS. 7A through 7D, views of aspects of one system for playing media in accordance with embodiments of the present disclosure are shown. Except where otherwise noted, reference numerals preceded by the number "7" shown in FIGS. 7A through 7D indicate components or features that are similar to components or features having reference numerals preceded by the number "5" shown in FIG. 5A or 5B, by the number "3" shown in FIG. 3, by the number "2" shown in FIG. 2A or FIG. 2B or by the number "1" shown in FIGS. 1A through 1E.

Figure 7A:
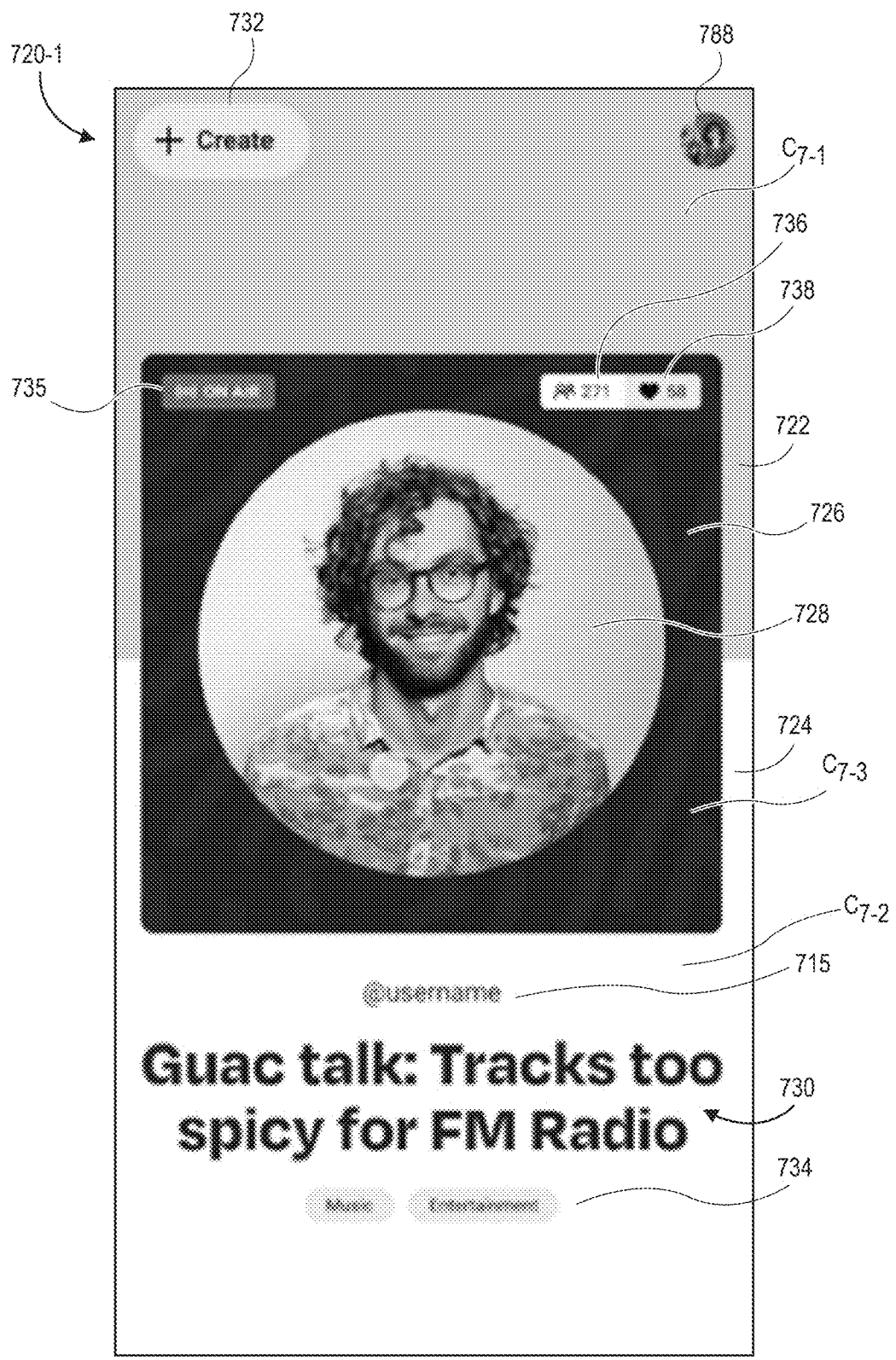
FIGS. 7A through 7D are views of aspects of one system for playing media in accordance with embodiments of the present disclosure.

As is shown in FIG. 7A, a card 720-1 (or a page, a window or another user interface) includes an upper section 722 in a first color $C_{7-1}$, a lower section 724 in a second color $C_{7-2}$, and a middle section 726 (or third section) in a third color $C_{7-3}$, including an image 728 of a creator of a media program, or any other aspect of the media program, provided on a divider or boundary between the upper section 722 and the lower section 724. In some implementations, the first color $C_{7-1}$ may be selected from a color palette based on one or more colors depicted within the image 728, such as is discussed above with regard to FIGS. 5A and 5B. In some other implementations, the third color $C_{7-3}$ may be selected from the color palette based on the first color $C_{7-1}$, e.g., as a counterpart to the first color $C_{7-1}$, or to generate a visual contrast with the first color $C_{7-1}$. The card 720-1 may further include any number or type of other information or data regarding the media program, such as an identifier 730 (e.g., a title) of the media program, an identifier 715 (e.g., a name) of the creator, identifiers 736 of numbers of listeners to the media program, or listeners 738 that have provided a positive rating or interaction regarding the media program, an indicator 735 that the media program is currently being aired "live," an icon 788 associated with a profile of a listener, or any tags or other phrases identifying subjects, themes or topics of the media program, or any other information or data.

Figure 7B:
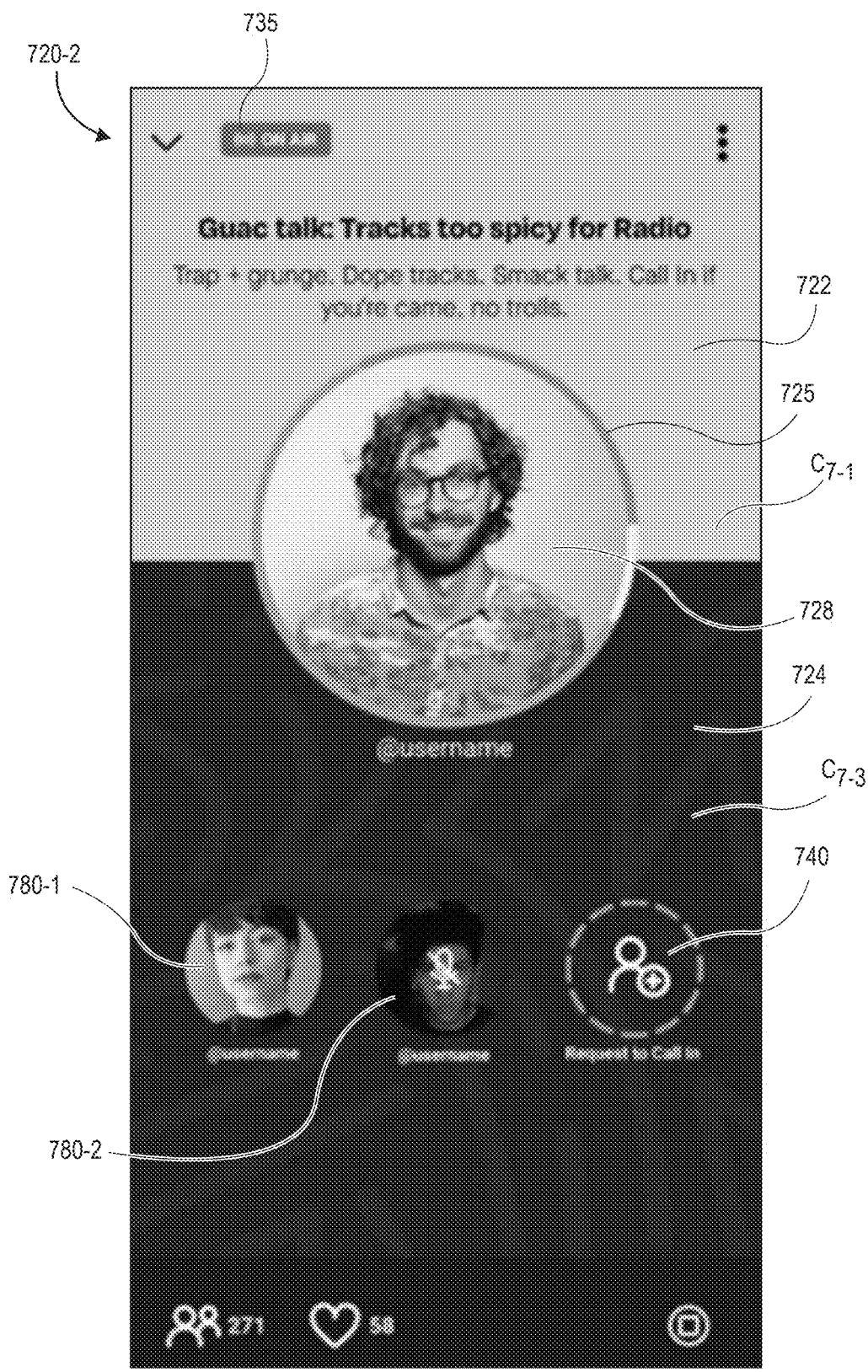

A listener may request to receive the media program by executing one or more gestures or other interactions with the card 720-1, e.g., by selecting the image 728, or executing any other gestures or interactions. Attributes or features of the card 720-1 may be included in other cards displayed during the media program. As is shown in FIG. 7B, a card 720-2 includes an upper section 722 in the first color $C_{7-1}$ and a lower section 724 in the third color $C_{7-3}$. The upper section 722 of the card 720-2 is smaller (e.g., shorter) than the upper section 722 of the card 720-1, and the lower section 724 of the card 720-2 is larger (e.g., taller) than the lower section 724 of the card 720-1. Additionally, the image 728 is provided on a divider or boundary between the upper section 722 or the lower section 724 of the card 720-2, and includes an icon 725 (e.g., a ring, a speaker ring, an accent icon, or another marking) provided around the image 728. The icon 725 may have any number of colors, sizes, dimensions, shapes, or other visual attributes that may be selected based on attributes of audio data being received from the creator.

Additionally, the card 720-2 further includes images 780-1, 780-2 of participants (e.g., guests or listeners) who are authorized or permitted to participate in the media program. The image 780-2 of the participant is darkened and includes a muted microphone icon superimposed thereon, indicating that the contributions by that participant are temporarily muted. The card 720-2 also includes an interactive feature 740 that, when selected, enables a listener to request to join or participate in the media program, e.g., in response to a request by the creator or at any other time.

Figure 7C:
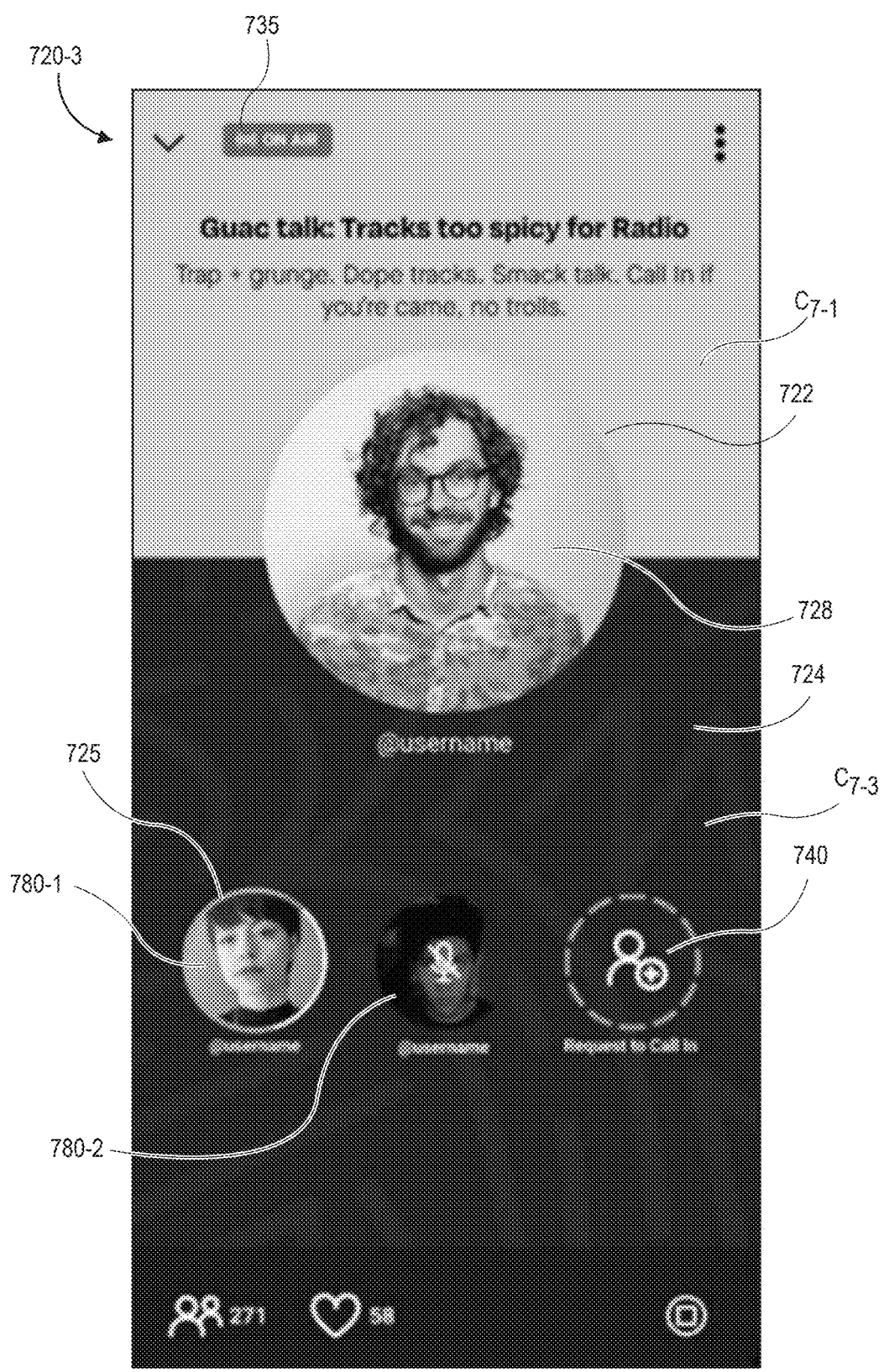

As is shown in FIG. 7C, when one of the participants depicted within the image 780-1 begins speaking, a card 720-3 including an upper section 722 in the first color $C_{7-1}$ and a lower section 724 in the third color $C_{7-3}$ is shown, with the image 728 provided on a divider or boundary between the upper section 722 or the lower section 724. Additionally, the card 720-3 further includes the images 780-1, 780-2 of the participants and the interactive feature 740, and the icon 725 shown in association with the image 780-1, with any number of colors, sizes, dimensions, shapes, or other visual attributes that may be selected based on attributes of audio data being received from that participant.

Figure 7D:
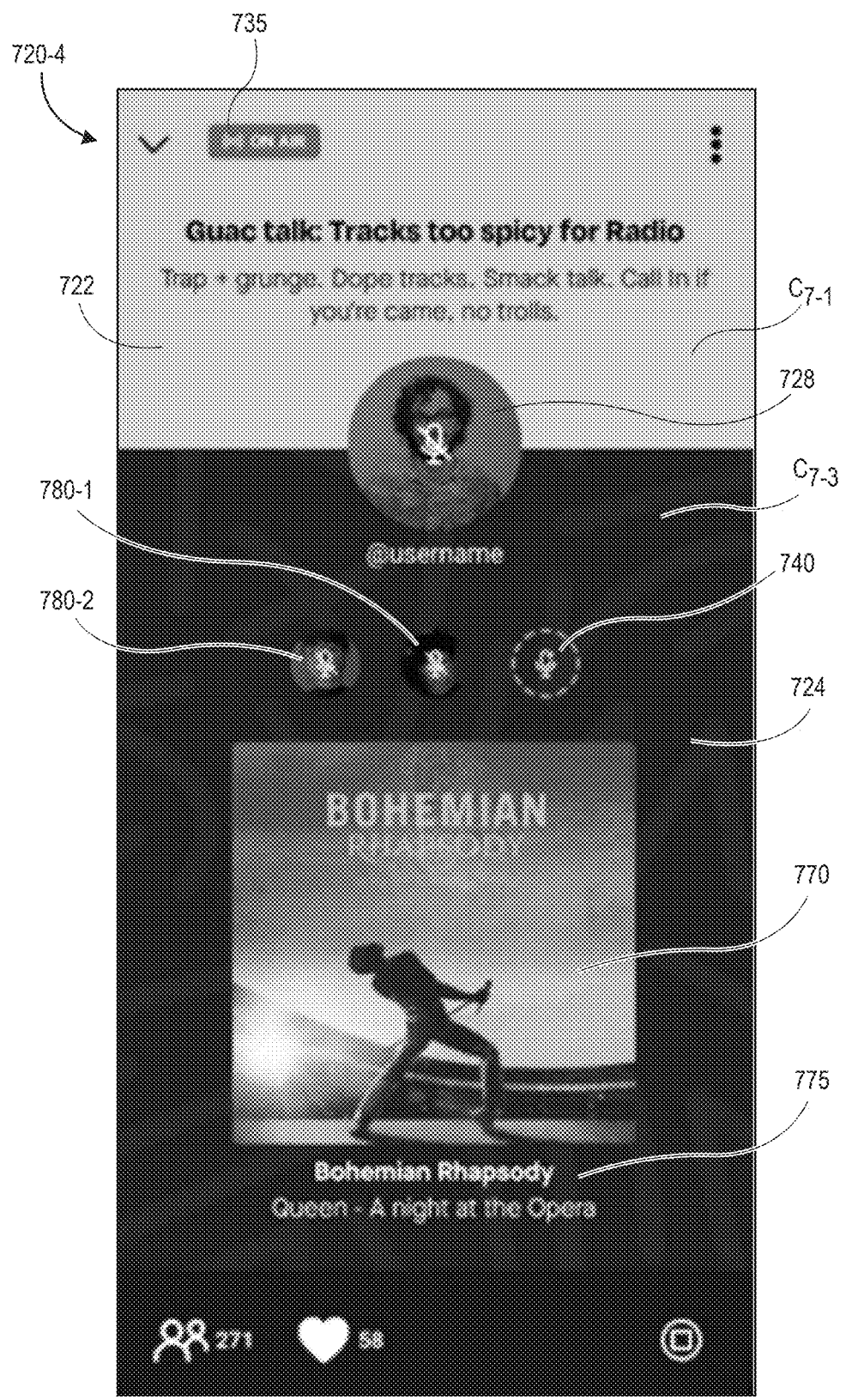

A creator may also cause one or more media entities to be played in accordance with a media program, and attributes or features of the cards 720-1, 720-2, 720-3 may be included in other cards displayed during the media program. As is shown in FIG. 7D, a card 720-4 includes an upper section 722 in the first color $C_{7-1}$ and a lower section 724 in the third color $C_{7-3}$. The upper section 722 of the card 720-4 is smaller (e.g., shorter) than the upper sections 722 of the card 720-1 or the cards 720-2, 720-3, and the lower section 724 of the card 720-4 is larger (e.g., taller) than the lower sections 724 of the card 720-1 or the cards 720-2, 720-3. Additionally, the image 728 is provided on a divider or boundary between the upper section 722 or the lower section 724 of the card 720-4, in a smaller size than the image 728 in any of the cards 720-1, 720-2, 720-3. The card 720-4 also includes images 780-1, 780-2 of the participants (e.g., guests or listeners) and the interactive feature 740 provided beneath the image 728.

Additionally, the card 720-4 further includes an image 770 associated with a media entity (e.g., an album) and a title 775 of the media entity, provided in the lower section 724 of the card 720-4. The image 770 and the title 775 may be displayed when the media entity is played in accordance with the media program, e.g., upon a selection or instruction of the creator, which may cause one or more one-way connections or unidirectional channels to be established with a media source having access to the media entity, and the media entity to be transmitted to a control system and then to devices of any number of listeners via one or more networks. Moreover, because the media entity is being played, neither the image 728 nor either of the images 780-1, 780-2 includes an accent icon associated therewith, and each of the images 728 and the images 780-1, 780-2 is darkened and includes a muted microphone icon superimposed or overlaid thereon, indicating that media content is not being received from the creator or either of the participants.

Figure 8:
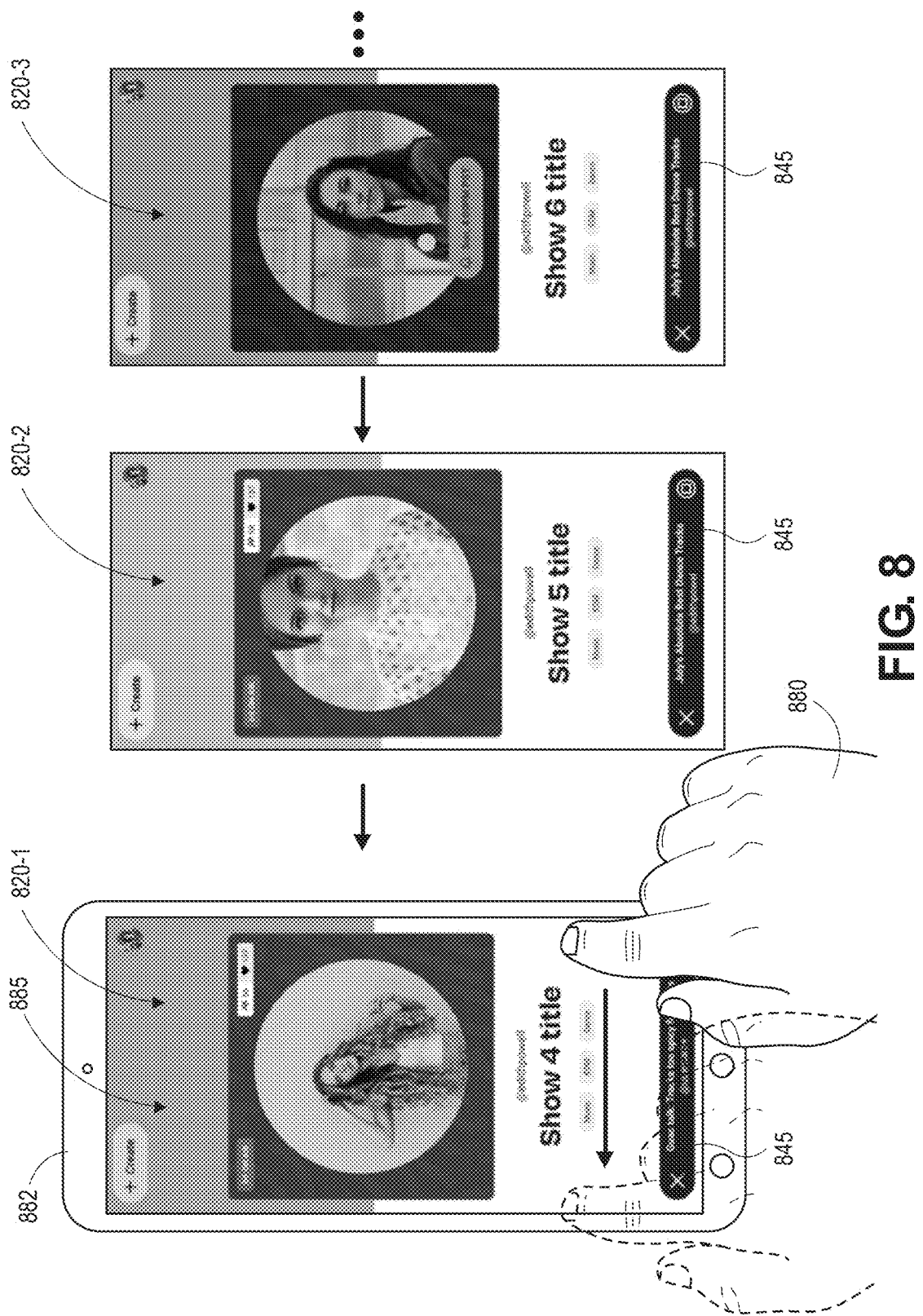
FIG. 8 is a view of aspects of one system for playing media in accordance with embodiments of the present disclosure.

A listener may operate an application for playing media to review user interfaces associated with media programs, such as by scrolling between such pages, in a dynamic manner, and may select a media program based on one of such pages. Referring to FIG. 8, views of aspects of one system for playing media in accordance with embodiments of the present disclosure are shown. Except where otherwise noted, reference numerals preceded by the number "8" shown in FIG. 8 indicate components or features that are similar to components or features having reference numerals preceded by the number "7" shown in FIGS. 7A through 7D, by the number "5" shown in FIG. 5A or 5B, by the number "3" shown in FIG. 3, by the number "2" shown in FIG. 2A or FIG. 2B or by the number "1" shown in FIGS. 1A through 1E.

As is shown in FIG. 8, a mobile device 882 includes a first card (or another user interface) 820-1 rendered in a user interface on a display 885. The first card 820-1 includes an image associated with a first media program, e.g., an image of a creator of the first media program, as well as a title of the first media program, and any other information regarding the first media program. The first card 820-1 is displayed in accordance with a first visual theme and includes sections having colors selected based on colors of the image, including a first color selected based on a predominant color of the image (e.g., as determined according to a histogram), a second color that is white or substantially neutral, and a third color that is a counterpart to the first color. In some implementations, media content of the first media program may be automatically transmitted to the mobile device 882 when the first card 820-1 is displayed thereon, such as where the first media program is being aired "live" to devices of listeners. Alternatively, a listener 880 may request to receive the first media program by executing one or more interactions with the display 885 when the first card 820-1 is displayed thereon.

As is further shown in FIG. 8, the display 885 further includes a window 845 overlaying the first card 820-1. The window 845 includes an identifier of a media program then being played by the mobile device 882, as well as one or more controls for stopping, pausing or playing the media program, or one or more interactive features for causing the window 845 to be removed from the display 885. In some implementations, upon a selection of a portion of the window 845, a user interface associated with the media program then being played may be shown on the display 885, and in a visual theme associated with that media program.

A listener or another operator of the mobile device 882 may also request to receive information or data associated with a different media program by one or more gestures or other interactions with the display 885. For example, as is shown in FIG. 8, the listener 880 swipes, slides or otherwise move the first card 820-1 off the display 885, and a second page 820-2 replaces the first page 820-1 and appears thereon. The window 845 remains in position on the display 885 as the second card 880-2 replaces the first card 820-1.

The second card 820-2 is similar to the first card 820-1 in one or more respects and includes information or data regarding a second media program in accordance with a second visual theme, e.g., an image of a creator of the second media program, as well as a title of the second media program, sections having colors selected based on colors of the image, including a first color selected based on a predominant color of the image (e.g., as determined according to a histogram), a second color that is white or substantially neutral, and a third color that is a counterpart to the first color, or any other information or data. In some implementations, media content of the second media program may be automatically transmitted to the mobile device 882 when the second card 820-2 is displayed thereon, e.g., where the second media program is being aired "live" to devices of listeners, or a listener 880 may request to receive the second media program by executing one or more interactions with the display 885.

A listener or another operator of the mobile device 882 may further request to receive a different media program by one or more gestures or other interactions with the display 885. For example, as is further shown in FIG. 8, when the listener 880 swipes, slides or otherwise moves the second card 820-2 off the display 885, a third card 820-3 replaces the second card 820-2 and appears thereon.

The third card 820-3 is similar to the first card 820-1 or the second card 820-2 in one or more respects and includes information or data regarding a third media program in accordance with a third visual theme, e.g., an image of a creator of the third media program, as well as a title of the third media program, sections having colors selected based on colors of the image, including a first color selected based on a predominant color of the image (e.g., as determined according to a histogram), a second color that is white or substantially neutral, and a third color that is a counterpart to the first color, or any other information or data. In some implementations, media content of a past episode or version of the third media program may be automatically transmitted to the mobile device 882 when the third card 820-3 is displayed thereon, e.g., where the third media program is not then being transmitted to devices of listeners, or a listener 880 may request to schedule to receive the third media program by executing one or more interactions with the display 885.

As is discussed above, an application for playing media by a computer device or system associated with a listener may include one or more interactive features that enable the listener to become a creator of a media program, and generate a visual theme for displaying user interfaces (e.g., pages, cards, windows or other interfaces) based on one or more images selected by or otherwise associated with the listener. Referring to FIGS. 9A through 9H, views of aspects of one system for playing or creating media in accordance with implementations of the present disclosure are shown. Except where otherwise noted, reference numerals preceded by the number "9" shown in FIGS. 9A through 9H, indicate components or features that are similar to components or features having reference numerals preceded by the number "8" shown in FIG. 8, by the number "7" shown in FIGS. 7A through 7D, by the number "5" shown in FIG. 5A or 5B, by the number "3" shown in FIG. 3, by the number "2" shown in FIG. 2A or FIG. 2B or by the number "1" shown in FIGS. 1A through 1E.

Figure 9A:
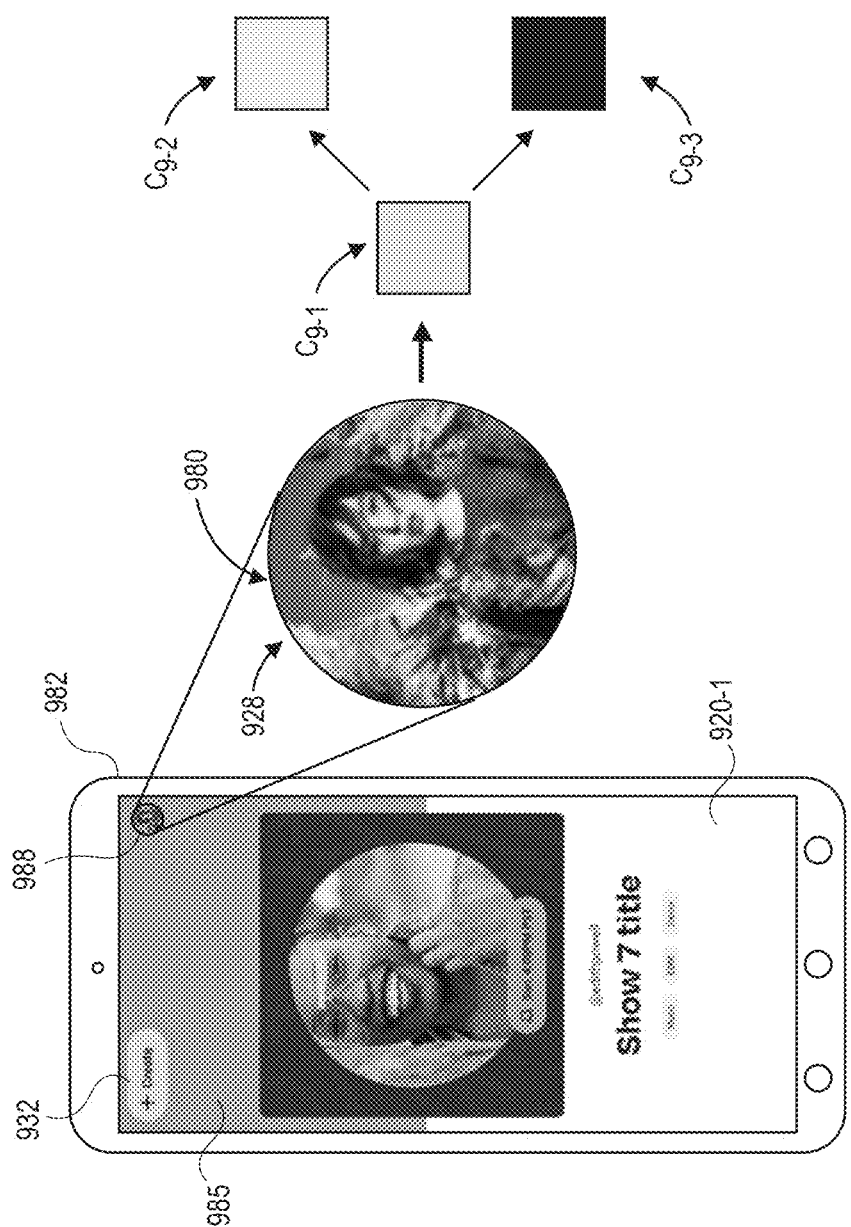
FIGS. 9A through 9H are views of aspects of one system for playing or creating media in accordance with implementations of the present disclosure.

As is shown in FIG. 9A, a mobile device 982 includes a user interface 920-1 (e.g., a page, a card, a window or another user interface) rendered on a display 985. The user interface 920-1 is associated with a media program, and may be displayed by an application for playing or creating media operating on the mobile device 982, or by any other computer device or system.

The user interface 920-1 includes a plurality of sections in various colors or having various features, e.g., in accordance with a visual theme generated for the media program. The user interface 920-1 further includes an interactive feature 932 that, upon a selection by an operator 980 (e.g., a listener) of the mobile device 982, may enable the operator 980 to become a creator of a media program. The user interface 920-1 also includes an icon 988 that may be selected to access or identify information regarding the operator 980, e.g., a profile or another set of information or data identifying one or more settings or preferences associated with the operator 980 or the mobile device 982. The icon 988 further includes an image 928 of the operator 980, which may be stored in a profile of the operator 980 or in any other file, record or location associated with the operator 980.

In some implementations, where the operator 980 expresses an interest in becoming a creator (or a host) of a media program, e.g., upon a selection of the interactive feature 932, or at any other time, an image associated with (or selected by or for) the operator 980 may be processed to identify a color $C_{9\text{-}1}$ included in the image 928, e.g., by a color histogram, or on any other basis. Alternatively, a color may be identified within any other image associated with the operator 980 or a media program that the operator 980 intends to create or host, and the image need not depict the operator 980. Moreover, once the color $C_{9\text{-}1}$ has been identified from the image 928, a color $C_{9\text{-}2}$ and a color $C_{9\text{-}3}$ may be selected from a color palette, or otherwise identified from any other source. For example, in some implementations, the color $C_{9\text{-}2}$ may be selected based on its proximity to the color $C_{9\text{-}1}$ identified from the image 928, while the color $C_{9\text{-}3}$ may be selected as a counterpart to the color $C_{9\text{-}2}$, e.g., based on a level of contrast between the color $C_{9\text{-}2}$ and the color $C_{9\text{-}3}$.

Figure 9B:
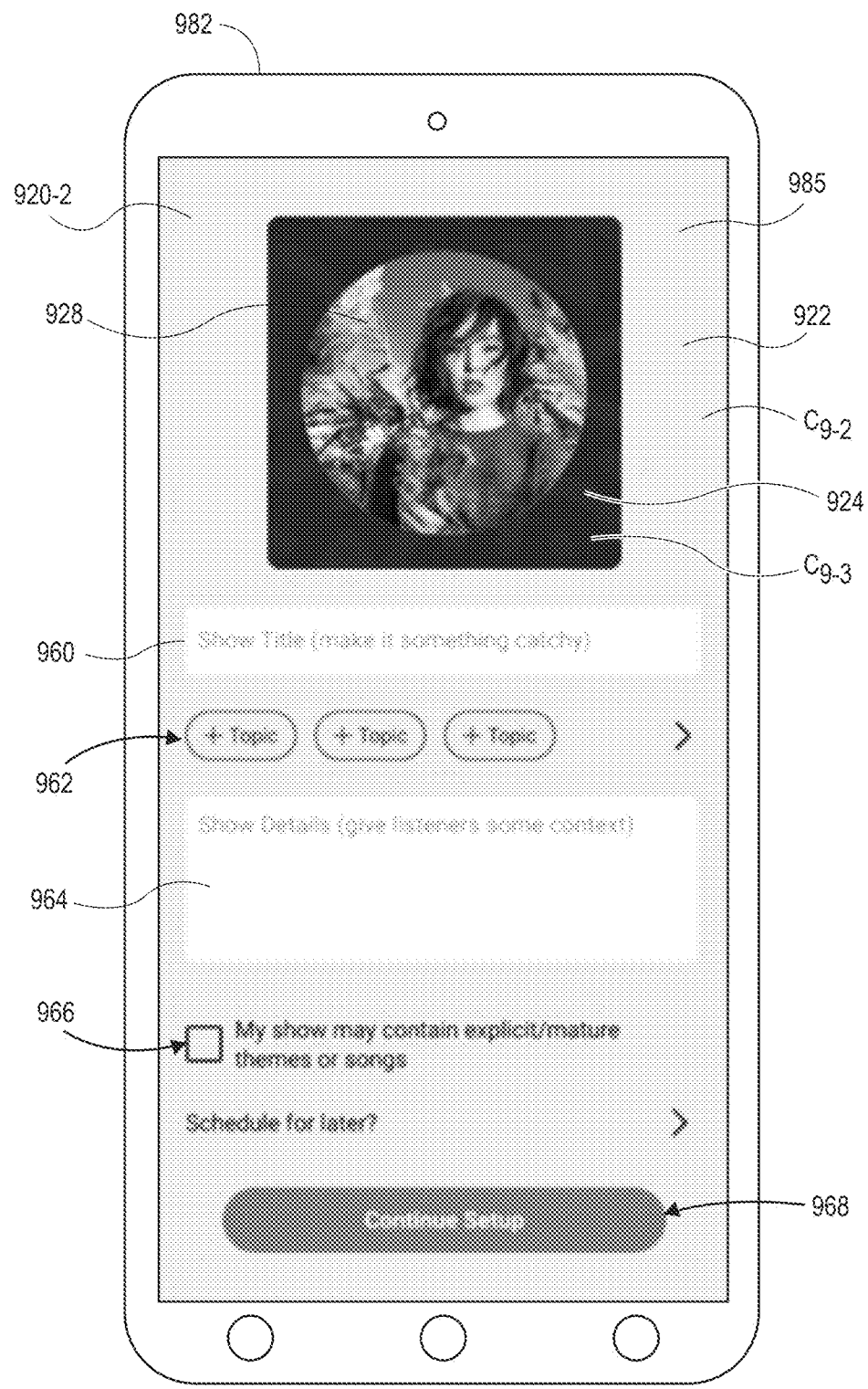

Upon receiving the selection of the interactive feature 932 of the user interface 920-1 shown in FIG. 9A, an application operating on the mobile device 982 permits the operator 980 to designate one or more parameters of a media program that the operator 980 intends to air as a creator or host. In some implementations, the application may cause one or more user interfaces to be displayed in accordance with a visual theme including the color $C_{9-2}$, the color $C_{9-3}$ and the image 928. As is shown in FIG. 9B, a user interface 920-2 is displayed on the display 985 of the mobile device 982. The user interface 920-2 includes a first section 922 in the color $C_{9-2}$ and a second section 924 in the color $C_{9-3}$, e.g., in accordance with a visual theme.

The first section 922 of the user interface 920-2 occupies an entire height and width of the display 985, and includes a text box 960 for receiving a title of a media program, a plurality of interactive features 962 that enable the selection of a topic or theme of the media program, a text box 964 for entering a description or one or more details of the media program, a check box 966 for indicating that the media program may include explicit language or mature content, and an interactive feature 968 (e.g., a button) that may be selected to confirm entries of a title, a description or details, selections of topics or themes, or designations of explicit language or mature content. Alternatively, the user interface 920-2 may include any other interactive features that enable an operator of the mobile device 982 to designate any other attributes of a media program, or to provide any other information or data regarding the media program.

The second section 924 of the user interface 920-2 has a frame with a substantially square shape and includes the image 928 therein. The second section 924 of the user interface 920-2 is provided above the text box 960, and has a width that is slightly less than a width of the display 985, such that portions of the first section 922 in the color $C_{9-2}$ surround the second section 924 in the color $C_{9-3}$, above, below and on either side of the second section 924 of the user interface 920-2.

Figure 9C:
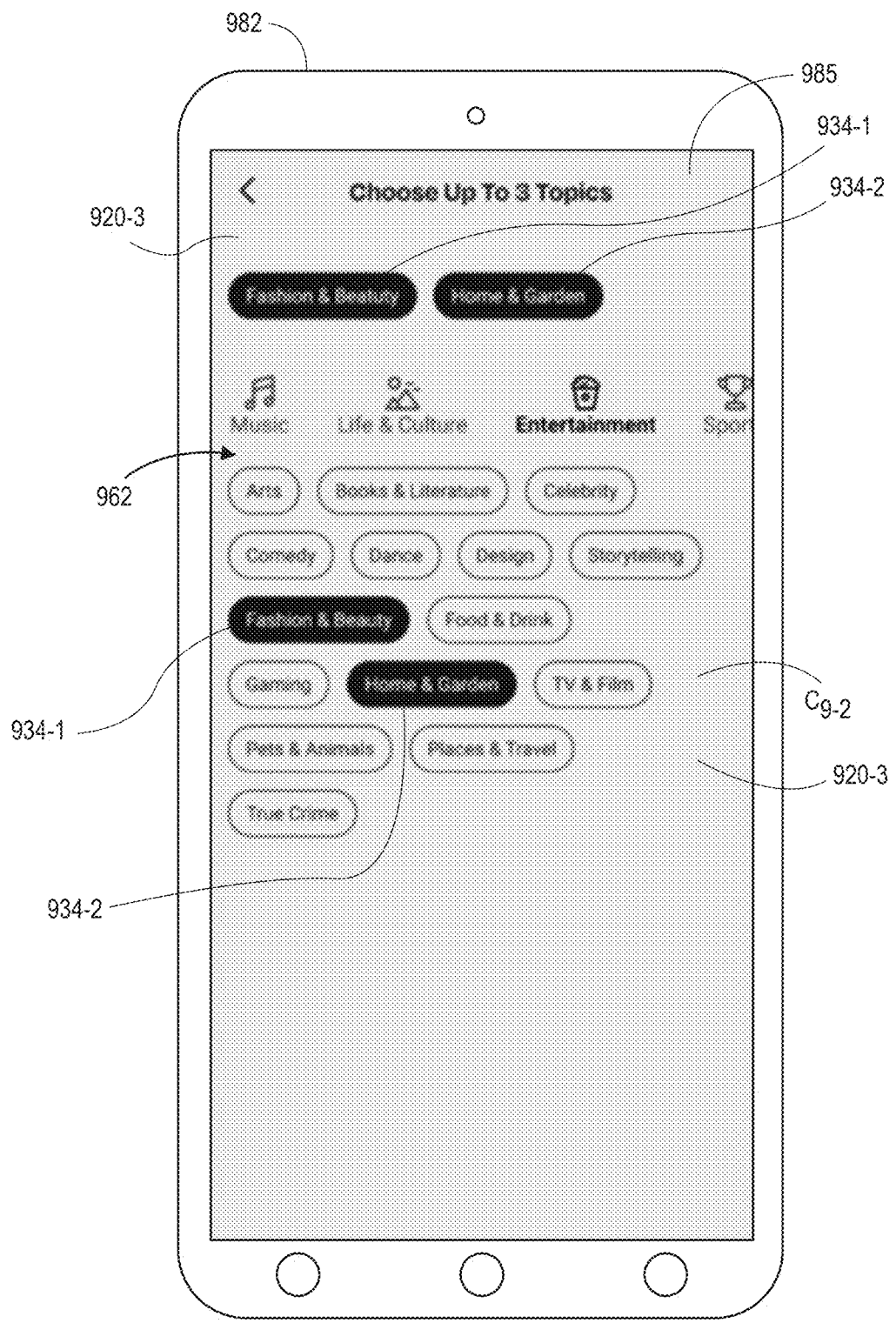

Upon receiving a selection of one or more of the interactive features 962 of the user interface 920-2 of FIG. 9B, an application operating on the mobile device 982 permits the operator 980 to designate one or more topics or themes of the media program by gestures or other interactions with the display 985. As is shown in FIG. 9C, a user interface 920-3 is displayed on the display 985 of the mobile device 982. The user interface 920-3 includes a plurality of interactive features 962, any of which may be selected in order to indicate one or more topics of a media program. As is shown in FIG. 9C, the operator 980 selects two of the interactive features 962, e.g., a topic 934-1 (viz., "Fashion & Beauty") and a topic 934-2 (viz., "Home & Garden"). Additionally, as is shown in FIG. 9C, a background of the user interface 920-3 is shown in the color $C_{9-2}$. Alternatively, one or more portions of the user interface 920-3 may be in any color, e.g., the color $C_{9-3}$ or any other color, in accordance with a visual theme of the media program.

Figure 9D:
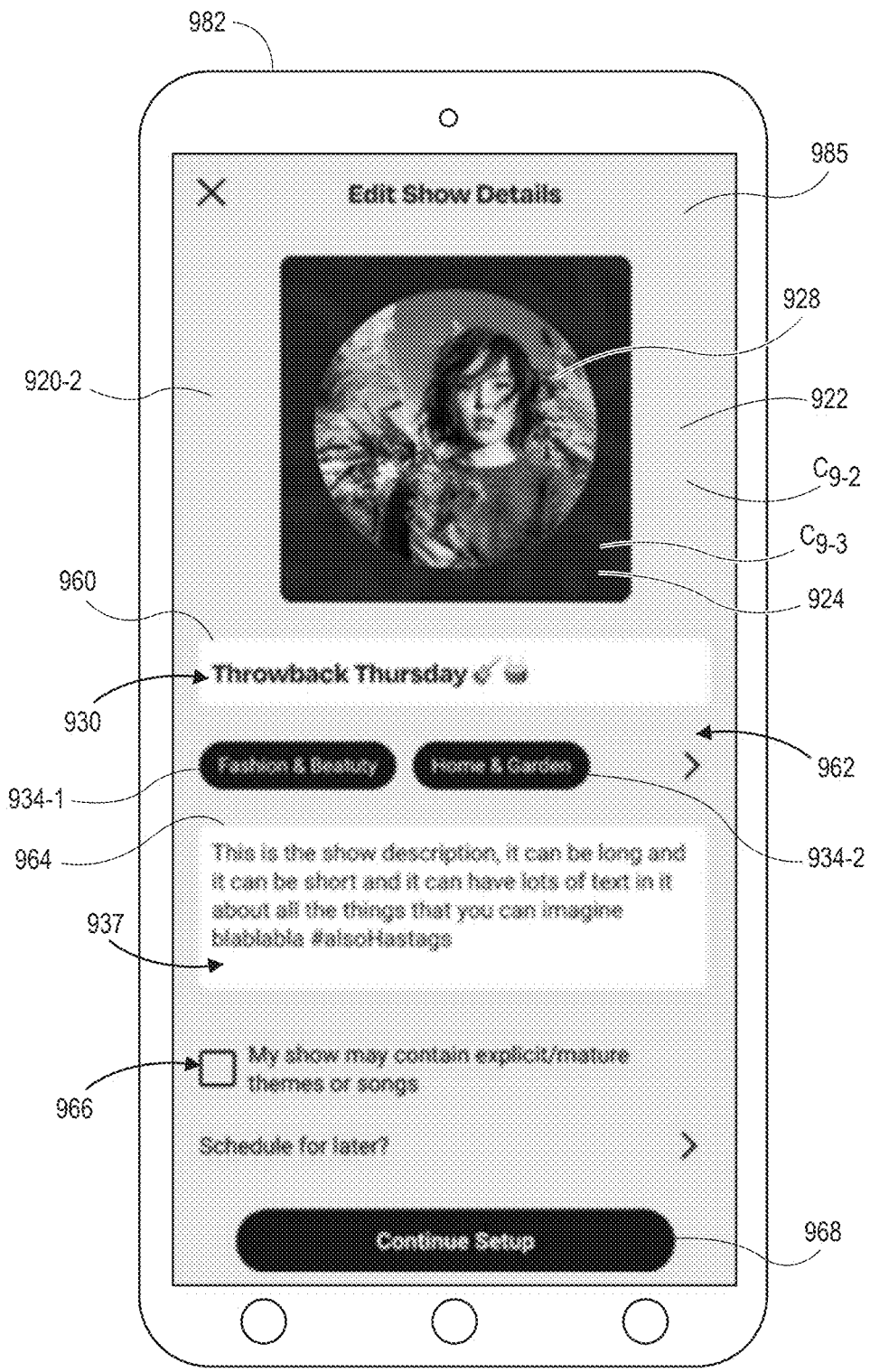

Upon selecting one or more topics or themes of a media program via the user interface 920-3, the operator 980 may return to the user interface 920-2, e.g., by one or more gestures or other interactions with a back arrow, a carat or another feature on the user interface 920-3, or in any other manner. As is shown in FIG. 9D, the operator 980 may enter one or more alphanumeric characters, symbols or any other indicia into the text box 960 to designate a title 930 of the media program, and enter one or more alphanumeric characters, symbols or any other indicia into the text box 964 to provide a description 937 of the media program. The operator 980 may check or uncheck the check box 966 to indicate whether the media program may include explicit material or mature content, and may select the interactive feature 968 to continue establishing one or more other parameters of the media program, or to initiate an airing of the media program.

Upon receiving a selection of the interactive feature 968 of the user interface 920-2 of FIG. 9D, an application operating on the mobile device 982 displays one or more user interfaces that permit the operator 980 to initiate an airing of the media program, or to designate one or more other parameters of the media program.

Figure 9E:
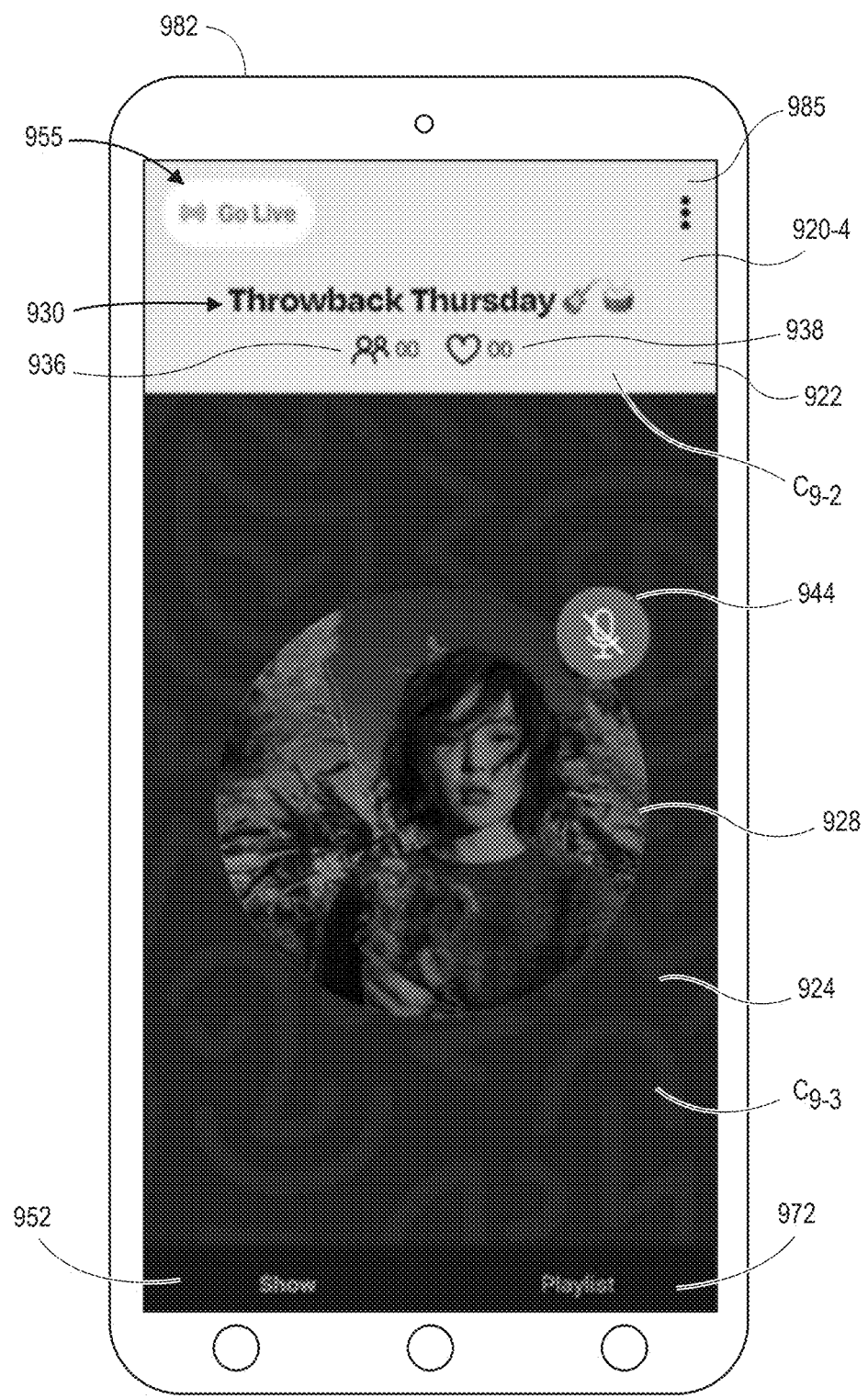

As is shown in FIG. 9E, a user interface 920-4 is displayed on the display 985 of the mobile device 982. The user interface 920-4 includes a first section 922 in the color $C_{9-2}$ and a second section 924 in the color $C_{9-3}$. The first section 922 of the user interface 920-4 includes the title 930 of the media program designated by the operator 980, as well as an identifier 936 of a number of listeners to the media program and an identifier 938 of a number of such listeners who have provided a positive rating or interaction regarding the media program. In some implementations, a color of a font of the title 930 or colors of the identifiers 936, 938 may be selected to provide a visual contrast with the color $C_{9-2}$ of the first section 922, in accordance with the visual theme. The first section 922 also includes an interactive feature 955 that, when selected, causes the media program to begin airing, and enables the operator 980 to provide media content for inclusion in the media program via the mobile device 982.

The second section 924 of the user interface 920-4 includes the image 928 of the operator 980 provided on a background in the color $C_{9-3}$, in accordance with the visual theme. The second section 924 further includes an interactive feature 944 provided in association with the image 928 that may be selected, when the media program is being aired, in order to mute the mobile device 982, e.g., to enable or prevent the mobile device 982 to capture audio data in the form of spoken or sung words, or other audio data, and transmit the audio data for inclusion in the media program. As is shown in FIG. 9E, the interactive feature 944 has a darkened appearance and depicts an icon representing a microphone with a slash or another diagonal line passing therethrough, thereby indicating that the mobile device 982 is not enabled to capture audio data.

Below the second section 924, an interactive feature 952 (e.g., a button) that may be selected to enable the operator 980 to designate any number of other parameters of the media program is provided. Also below the second section 924, an interactive feature 972 (e.g., a button) that may be selected to enable the operator 980 to designate any number of media entities (e.g., songs) to be included in a playlist to be played during the media program is also provided.

Figure 9F:
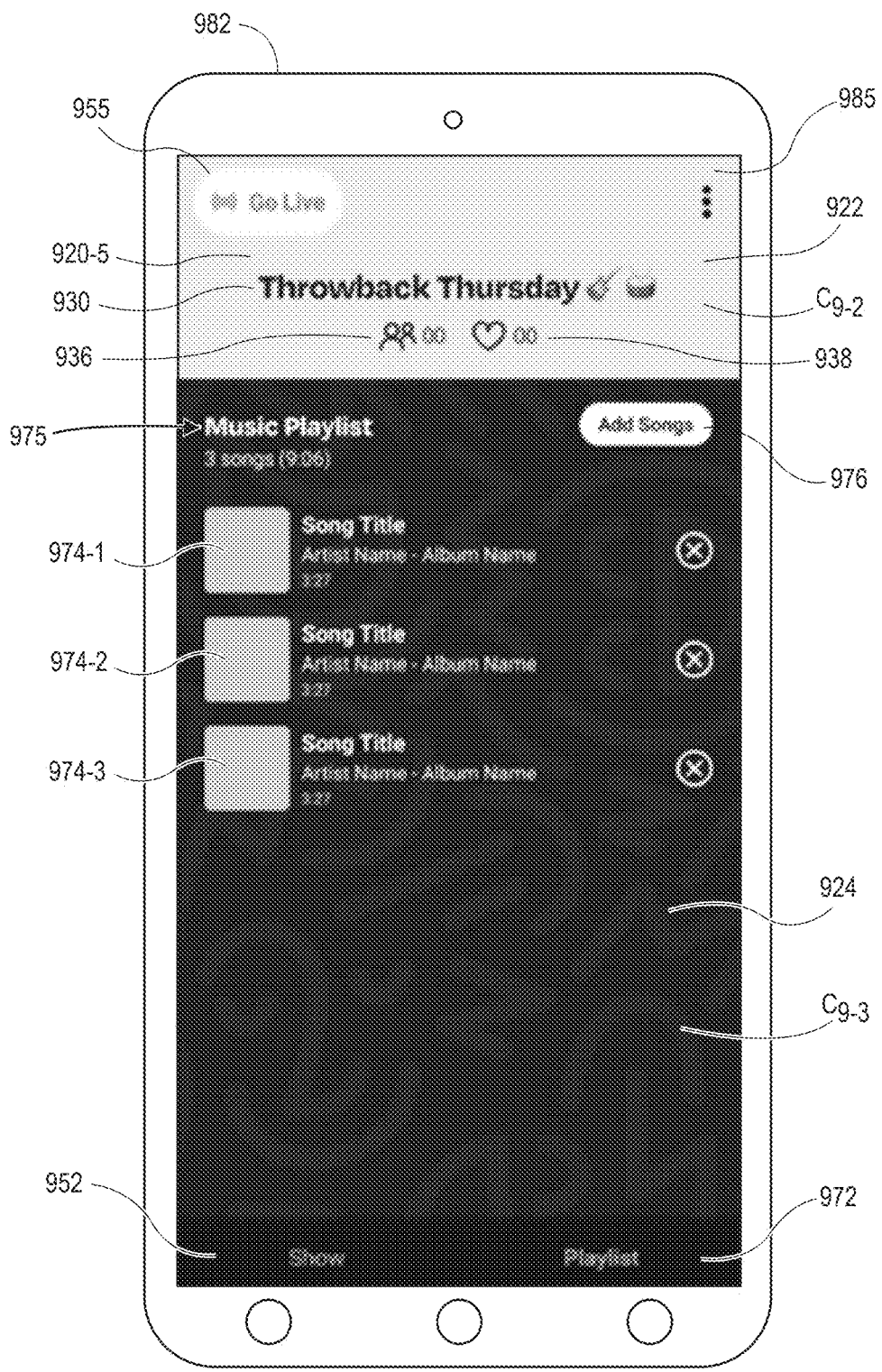

Upon receiving a selection of the interactive feature 972 of the user interface 920-4 of FIG. 9E, an application operating on the mobile device 982 permits the operator 980 to select one or more media entities (e.g., songs) for inclusion in a playlist or to be otherwise played during the media program. As is shown in FIG. 9F, a user interface 920-5 is displayed on the display 985 of the mobile device 982. The user interface 920-5 includes a first section 922 in the color $C_{9-2}$ and a second section 924 in the color $C_{9-3}$, in accordance with the visual theme. The first section 922 of the user interface 920-5 includes the title 930, as well as the identifier 936 and the identifier 938. The first section 922 further includes the interactive feature 955.

The second section 924 of the user interface 920-5 further displays a playlist 975 having a plurality of media entities 974-1, 974-2, 974-3 (e.g., songs) to be played during the media program. The media entities 974-1, 974-2, 974-3 may be identified by any number of images, icons or sets of text, which may indicate a title of a media entity, an artist associated with the media entity, an album or another set of media entities with which the media entity is associated, a duration of the media entity, or any other information or data. Additionally, the second section 924 further includes an interactive feature 976 that may be selected by the operator 980 in order to permit the operator 980 to add one or more media entities to the playlist 975, remove one or more media entities from the playlist, or modify an order of media entities in the playlist 975.

Upon receiving a selection of the interactive feature 955 of the user interface 920-5 of FIG. 9F, an application operating on the mobile device 982 displays one or more user interfaces that enable the operator 980 to confirm that he or she intends to initiate a "live" broadcast of the media program, e.g., in real time or near-real time via the mobile device 982.

Figure 9G:
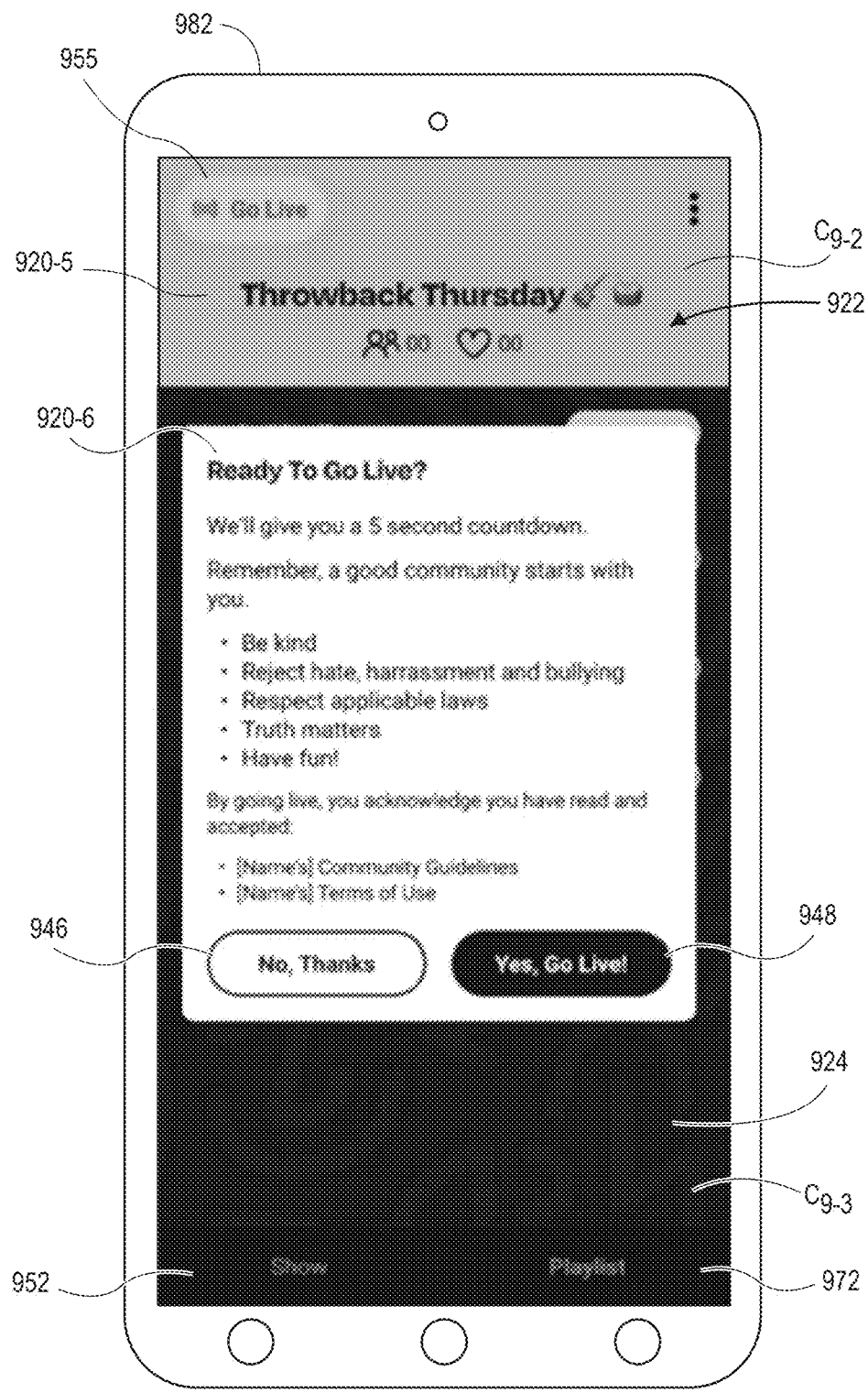

As is shown in FIG. 9G, a user interface 920-6 is displayed over the user interface 920-5. The user interface 920-6 includes information or data regarding a procedure for initiating the media program, as well as a reminder of standards of conduct and terms of use. The user interface 920-6 also includes an interactive feature 946 (e.g., a button) that may be selected by the operator 980 in order to decline to initiate the "live" broadcast of the media program, and an interactive feature 948 that may be selected by the operator 980 in order to confirm that he or she intends to initiate the media program.

Figure 9H:
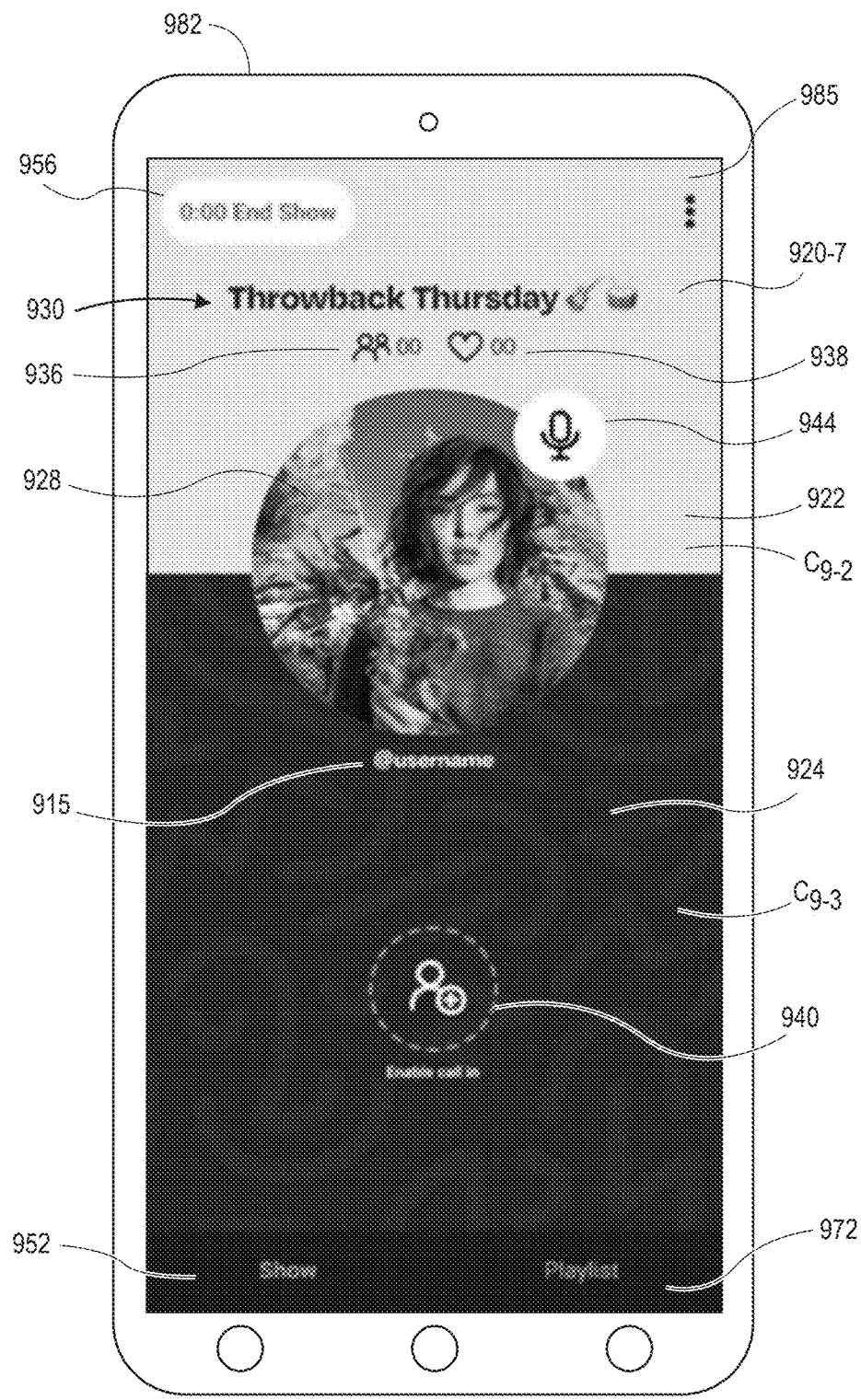

Upon receiving a selection of the interactive feature 948 of the user interface 920-6 of FIG. 9G, an application operating on the mobile device 982 is configured to capture audio data representing spoken or sung words or any other sounds and transmit the audio data to a control system or another system for transmission to devices of listeners to the media program. As is shown in FIG. 9H, a user interface 920-7 is displayed on the display 985 of the mobile device 982. The user interface 920-7 includes a first section 922 in the color $C_{9-2}$ and a second section 924 in the color $C_{9-3}$, in accordance with the visual theme. The first section 922 of the user interface 920-7 includes the title 930, as well as the identifier 936 and the identifier 938. The first section 922 further includes an interactive feature 956 that may be selected by the operator 980 to terminate the media program. The interactive feature 956 also includes a clock or another timer indicating an elapsed time since a start of the media program.

The second section 924 of the user interface 920-7 includes an interactive feature 940 that may be selected by the operator 980 to permit any number of listeners to request to contact a control system or the mobile device 982 and request to participate in the media program. Additionally, the interactive features 952, 972 are provided below the second section 924 of the user interface 920-7.

As is further shown in FIG. 9H, the image 928 is provided on a divider or boundary between the first section 922 in the color $C_{9-2}$ and the second section 924 in the color $C_{9-3}$. The interactive feature 944 is provided in association with the image 928. As is shown in FIG. 9H, the interactive feature 944 has a lightened appearance and depicts the icon representing the microphone without the slash or other diagonal line passing therethrough, thereby indicating that the mobile device 982 is configured to capture audio data, and that such audio data will be transmitted to a control system (or another device or system) and to devices of any number of listeners to the media program.

Although the disclosure has been described herein using exemplary techniques, components, and/or processes for implementing the systems and methods of the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

Likewise, although some of the embodiments described herein or shown in the accompanying figures refer to media programs including audio files, the systems and methods disclosed herein are not so limited, and the media programs described herein may include any type or form of media content, including not only audio but also video, which may be transmitted to and played on any number of devices of any type or form. Where a media program includes video files, alternatively or in addition to audio files, a consumer of the media program may be a viewer or a listener, and the terms "viewer" and "listener" may likewise be used interchangeably herein.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the flow chart shown in FIG. 4 or 6, orders in which such methods or processes are presented are not intended to be construed as any limitation on the claimed inventions, and any number of the method or process steps or boxes described herein can be combined in any order and/or in parallel to implement the methods or processes described herein.

Additionally, it should be appreciated that the detailed description is set forth with reference to the accompanying drawings, which are not drawn to scale. In the drawings, the use of the same or similar reference numbers in different figures indicates the same or similar items or features. Except where otherwise noted, one or more left-most digit (s) of a reference number identify a figure or figures in which the reference number first appears, while two right-most digits of a reference number in a figure indicate a component or a feature that is similar to components or features having reference numbers with the same two right-most digits in other figures.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The elements of a method, process, or algorithm described in connection with the embodiments disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. A first computer system comprising at least one data store and at least one computer processor,
  wherein the first computer system is connected to one or more networks,
  wherein the at least one data store has one or more sets of instructions stored thereon that, when executed by the at least one computer processor, cause the first computer system to perform a method comprising:
    generating first code for causing a display of a first card on a display, wherein the first card comprises:
      a first image associated with a first media program; and
      a first identifier associated with the first media program;
    transmitting at least the first code to at least a plurality of computer systems over one or more networks;
    causing a display of at least the first card on displays of each of the plurality of computer systems;
    receiving, from each of the plurality of computer systems, interactions with at least a portion of the first card on displays of each of the plurality of computer systems; and
    in response to the interactions,
      transmitting at least second code for causing a display of a second card on the displays to each of the computer systems over the one or more networks, wherein the second card comprises:
        at least a portion of the first image;
        at least a portion of the first identifier; and
        an interactive feature for initiating participation in the first media program;
    establishing one-way audio connections with each of the plurality of computer systems;
    transmitting data for playing at least a first portion of the first media program to each of the plurality of computer systems over the one or more networks by way of the one-way audio connections;
    receiving, from a second computer system, a second interaction with the interactive feature, wherein the second computer system is one of the plurality of computer systems; and
    in response to the second interaction,
      terminating the one-way audio connection with the second computer system; and
      establishing a two-way audio connection with the second computer system;
    transmitting data for playing at least a second portion of the first media program to the plurality of computer systems other than the second computer system over the one or more networks by way of the one-way audio connections with each of the plurality of computer systems other than the second computer system:
    transmitting at least the data for playing at least the second portion of the first media program to the second computer system over the one or more networks by way of the two-way audio connection;
    causing a display of a first accent icon in association with the portion of the first image on the second card on the displays of each of the plurality of computer systems; and
    causing a display of a second image associated with a user of the second computer system on the second card on the displays of each of the plurality of computer systems.

2. The first computer system of claim 1, wherein the method further comprises:
  receiving data from the second computer system over the one or more networks, wherein the data represents at least one word spoken by the user of the second computer system;
  removing the first accent icon from the second card on the displays of each of the plurality of computer systems;
  causing a display of a second accent icon in association with the second image on the second card on the displays of each of the plurality of computer systems; and
  transmitting data for playing at least a third portion of the first media program to at least the second computer system over the one or more networks by way of the two-way audio connection,
  wherein the third portion of the first media program represents the at least one word spoken by the user of the second computer system.

3. The first computer system of claim 1, further comprising:
  determining at least a first attribute of the first portion of the media program, wherein the first attribute comprises a frequency, an intensity, a sound pressure level, or a speech rate of words spoken; and selecting at least a second attribute of the first accent icon based at least in part on the first attribute, wherein the second attribute comprises a color, a size, a dimension or a shape of the first accent icon, and wherein the first accent icon is displayed in a manner consistent with the second attribute.

4. The first computer system of claim 1, further comprising:

determining a visual theme for the first media program based at least in part on a first color selected based at least in part on at least one color in the first image and a second color selected based at least in part on the first color, wherein each of the first card and the second card are displayed in accordance with the visual theme.

5. A method comprising:

causing a display of first information regarding a first media program in a first user interface on a display of a first computer system, wherein the first information comprises a first set of text associated with the first media program and a first image associated with the first media program;

receiving a first interaction with at least a portion of the first user interface;

establishing a first one-way audio connection between a second computer system and the first computer system in response to the first interaction;

transmitting first audio data from the second computer system to at least the first computer system, wherein the first audio data is transmitted from the second computer system to the first computer system by way of the first one-way audio connection, and wherein the first audio data represents at least a first portion of the first media program;

causing at least the first audio data to be played by at least the first computer system;

while the first audio data is played by at least the first computer system, causing a display of second information regarding the first media program in a second user interface on the display of the first computer system, wherein the second information comprises the first image and at least a portion of the first set of text, and wherein the second user interface comprises a first interactive feature for initiating participation in the first media program; and receiving a second interaction with the first interactive feature;

in response to the second interaction, terminating the first one-way audio connection between the second computer system and the first computer system; and establishing a first two-way audio connection between the second computer system and the first computer system;

transmitting second audio data from the second computer system to at least the first computer system by way of the first two-way audio connection, wherein the second audio data represents at least a second portion of the first media program, and wherein the second portion of the first media program comprises at least one word spoken by a person associated with the first media program;

causing at least the second audio data to be played at least by the first computer system;

while the second audio data is played by at least the first computer system, causing a display of a first icon in association with the first image in the second user interface;

receiving third audio data by the second computer system from the first computer system by way of the first two-way audio connection, wherein the third audio data represents at least a third portion of the first media program, and wherein the third audio data comprises at least one word spoken by a person associated with the first computer system;

transmitting at least a portion of the third audio data from the second computer system to at least the first computer system by way of the first two-way audio connection;

causing at least the third audio data to be played by at least the first computer system; and while the third audio data is played by at least the first computer system, causing a display of a second image of a user associated with the first computer system in the second user interface;

removing the first icon from the second user interface; and causing a display of a second icon in association with the second image in the second user interface.

6. The method of claim 5, wherein causing the display of the second image of the user associated with the first computer system in the second user interface comprises:

replacing the first interactive feature with the second image in the second user interface.

7. The method of claim 5, wherein the first icon is a ring provided about at least the portion of the first image.

8. The method of claim 5, further comprising:

determining, by the second computer system, at least one attribute of the second audio data; and selecting, by the second computer system, at least one attribute of the first icon based at least in part on the at least one attribute of the second audio data.

9. The method of claim 8, further comprising:

wherein the at least one attribute of the second audio data is one of a frequency, an intensity, a sound pressure level or a speech rate, and wherein the at least one attribute of the first icon is one of a color, a dimension, a shape or a size.

10. The method of claim 9, further comprising:

transmitting fourth audio data from the second computer system to at least the first computer system by way of the first two-way audio connection, wherein the fourth audio data represents at least a third portion of the first media program, and wherein the third portion of the first media program comprises at least one word spoken by the person associated with the first media program;

causing at least the fourth audio data to be played by the first computer system;

determining, by the second computer system, at least one attribute of the fourth audio data; and varying, by the second computer system, the at least one attribute of the first icon based at least in part on the at least one attribute of the fourth audio data.

11. The method of claim 5, further comprising:

receiving, by the second computer system from a third computer system, the first audio data at approximately a first time, wherein the third computer system is associated with a person associated with the first media program, wherein the first interaction is received at approximately the first time, and
wherein the first information comprises an indicator that the first media program is being aired live.

12. The method of claim 5, further comprising:
establishing a plurality of one-way audio connections, wherein each of the plurality of audio connections is established between the second computer system and one of a plurality of computer systems,
wherein the first computer system is one of the plurality of computer systems,
wherein the first one-way audio connection is the one of the plurality of audio connections established between the second computer system and the first computer system, and
wherein transmitting the first audio data from the second computer system to at least the first computer system comprises:
    transmitting the first audio data from the second computer system to the first computer system and each of the plurality of computer systems by way of the plurality of one-way audio connections, and
    wherein the first information comprises a number of the plurality of computer systems.

13. The method of claim 5, further comprising:
establishing a second two-way audio connection between the second computer system and a third computer system,
wherein the second information further comprises a third image of a person associated with the third computer system.

14. The method of claim 13, further comprising:
receiving fourth audio data by the second computer system from the third computer system, wherein the fourth audio data comprises at least one word spoken by the person associated with the third computer system;
transmitting at least a portion of the fourth audio data from the second computer system to at least the first computer system; and
causing a display of a third icon in association with the third image.

15. The method of claim 5, further comprising:
transmitting, by the second computer system to the first computer system, a plurality of sets of data, wherein each one of the plurality of sets of data comprises information regarding one of a plurality of media programs including a set of text associated with the one of the plurality of media programs and an image associated with the one of the plurality of media programs; and
prior to causing the display of the first information regarding the first media program in the first user interface,
    causing a display of third information regarding a second media program in a third user interface on the display of the first computer system, wherein the third information comprises a second set of text associated with the second media program and a second image associated with the second media program; and
    receiving a second interaction with at least a portion of the third user interface, wherein the second interaction is a swipe of the third user interface,
wherein the display of the first information regarding the first media program in the first user interface on the display of the first computer system is caused in response to the second interaction.

16. The method of claim 5, further comprising:
transmitting fourth audio data from the second computer system to at least the first computer system, wherein the fourth audio data is transmitted from the second computer system to the first computer system by way of the first one-way audio connection, and wherein the fourth audio data represents at least one media entity;
causing at least the fourth audio data to be played by the first computer system; and
while the fourth audio data is played by the first computer system,
    causing a display of a second image associated with the at least one media entity in the second user interface.

17. The method of claim 5, further comprising:
selecting a first color based at least in part on at least one color in the first image, wherein the first color is one of a plurality of colors in a color palette selected based at least in part on proximity to the at least one color in the first image; and
selecting a second color based at least in part on the first color, wherein the second color is one of complementary to the first color, analogous to the first color, a triadic color to the first color or a tetradic color to the first color,
wherein an upper portion of the first user interface is displayed in the first color,
wherein a lower portion of the first user interface is displayed in the second color,
wherein an upper portion of the second user interface is displayed in the first color, and
wherein a lower portion of the second user interface is displayed in the second color.

18. The method of claim 5, further comprising:
transmitting fourth audio data from the second computer system to at least the first computer system by way of the first two-way audio connection, wherein the fourth audio data represents at least a fourth portion of the first media program, and wherein the fourth portion of the first media program comprises at least one word spoken by the person associated with the first media program;
causing at least the fourth audio data to be played at least by the first computer system;
removing the second icon from the second user interface; and
causing a display of the first icon in association with the first image in the second user interface.

19. A first computer system comprising a display, at least one data store and at least one processor,
wherein the at least one data store is programmed with one or more sets of instructions that, when executed by the at least one computer processor, cause the first computer system to at least:
receive a plurality of sets of data from a second computer system, wherein each one of the plurality of sets of data comprises a set of text associated with the one of a plurality of media programs and an image associated with the one of the plurality of media programs;
cause a display of a first user interface on the display based at least in part on a first set of data of the plurality of sets of data, wherein the first set of data is associated with a first media program of a plurality of media programs, and wherein the first user interface comprises a first set of text associated with the first media program and a first image associated with the first media program;

receive a first interaction by a user of the first computer system with at least a portion of the first user interface;

transmit information regarding the first interaction to the second computer system;

establish a one-way audio connection with the second computer system in response to the first interaction;

receive first audio data from the second computer system by way of the one-way audio connection in response to the first interaction, wherein the first audio data represents at least a first portion of the first media program;

cause at least the first audio data to be played by at least one speaker associated with the first computer system;

cause a display of a second user interface on the display of the first computer system, wherein the second user interface comprises the first image, at least a portion of the first set of text, and an interactive feature for initiating participation in the first media program;

receive a second interaction by the user of the first computer system with the interactive feature;

transmit information regarding the second interaction to the second computer system;

establish a two-way audio connection with the second computer system in response to the second interaction;

cause a display of a second image associated with the user of the first computer system in the second user interface;

receive second audio data from the second computer system by way of the two-way audio connection, wherein the second audio data represents at least a second portion of the first media program;

select at least one of a color, a dimension, a shape or a size of a first icon based at least in part on a frequency, an intensity, a sound pressure level or a speech rate of the second audio data; and cause a display of the first icon in association with one of the first image or the second image on the second user interface.

20. The first computer system of claim 19, further comprising a microphone, wherein the second audio data represents at least one word spoken by a creator of the first media program, wherein the first icon is displayed in association with the first image on the second user interface, and wherein the one or more sets of instructions, when executed by the at least one computer processor, further cause the first computer system to at least:

capture third audio data by the microphone;

transmit at least a portion of the third audio data to the second computer system by way of the two-way audio connection;

select at least one of a color, a dimension, a shape or a size of a second icon based at least in part on a frequency, an intensity, a sound pressure level or a speech rate of the third audio data;

remove the first icon from the second user interface; and cause a display of the second icon in association with the second image on the second user interface.

* * * * *